(12) United States Patent
Overman

(10) Patent No.: US 11,920,791 B1
(45) Date of Patent: Mar. 5, 2024

(54) TRAPPED VORTEX REVERSE FLOW COMBUSTOR FOR A GAS TURBINE

(71) Applicant: General Electric Company, Schenectady, NY (US)

(72) Inventor: Nicholas R. Overman, Sharonville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 18/166,600

(22) Filed: Feb. 9, 2023

(51) Int. Cl.
  F23R 3/16 (2006.01)
  F02C 7/00 (2006.01)
  F23R 3/00 (2006.01)

(52) U.S. Cl.
  CPC .......... F23R 3/16 (2013.01); F02C 7/00 (2013.01); F23R 3/002 (2013.01); F05D 2220/32 (2013.01); F05D 2240/35 (2013.01); F05D 2260/14 (2013.01)

(58) Field of Classification Search
  CPC ...... F02C 7/00; F23R 3/12; F23R 3/16; F23R 3/42; F23R 3/50; F23R 3/52; F23R 3/54; F23R 3/58; F23R 2900/00015; F23R 2900/03282
  See application file for complete search history.

(56) References Cited

U.S. PATENT DOCUMENTS

| | | | |
|---|---|---|---|
| 4,586,328 A * | 5/1986 | Howald | ............... F23R 3/52 60/737 |
| 6,951,108 B2 | 10/2005 | Burrus et al. | |
| 8,272,219 B1 * | 9/2012 | Johnson | ............... F23R 3/50 60/750 |
| 9,080,770 B2 | 7/2015 | Dudebout et al. | |
| 9,400,110 B2 | 7/2016 | Dudebout et al. | |
| 10,976,053 B2 | 4/2021 | Boardman et al. | |
| 11,371,710 B2 | 6/2022 | Bulat | |
| 2012/0023964 A1 | 2/2012 | Mehring | |
| 2019/0120493 A1 * | 4/2019 | Boardman | ............... F02C 3/14 |
| 2019/0162414 A1 | 5/2019 | Ogata et al. | |

FOREIGN PATENT DOCUMENTS

| | | |
|---|---|---|
| CN | 104676650 B | 1/2017 |
| CN | 111780165 B | 4/2022 |

OTHER PUBLICATIONS

Overman et al., U.S. Appl. No. 17/653,376, filed Mar. 3, 2022.

* cited by examiner

*Primary Examiner* — Scott J Walthour
(74) *Attorney, Agent, or Firm* — Venable LLP; Edward Kmett; Michele V. Frank

(57) ABSTRACT

A trapped vortex reverse flow combustor for a gas turbine includes a first dome structure having a plurality of first-dome vortex driver airflow openings for providing a first vortex generating mid airflow therethrough to a trapped vortex cavity. A second dome structure is arranged downstream of the first dome structure and includes a plurality of second-dome vortex driver airflow openings providing a first vortex generating outer airflow therethrough to the trapped vortex cavity, and a plurality of primary driver airflow openings providing a primary driver airflow therethrough radially inward of the trapped vortex cavity.

19 Claims, 13 Drawing Sheets

TRAPPED VORTEX REVERSE FLOW COMBUSTOR FOR A GAS TURBINE

TECHNICAL FIELD

The present disclosure relates to a trapped vortex reverse flow combustor for a gas turbine engine.

BACKGROUND

Gas turbine engines are known to include a trapped vortex-type combustor. In a trapped vortex-type combustor, the combustor includes a trapped vortex cavity and a main combustion chamber that leads to a turbine inlet of a turbine section of the gas turbine. At an upstream side of the combustor, a dome may include vortex generating airflow openings on an upstream side of the trapped vortex cavity, and a combustor liner may also include vortex generating openings downstream of the dome. Air provided to the combustor from a compressor flows through the vortex generating openings in the dome and the liner so as to generate a vortex airflow within the trapped vortex cavity. In addition, the dome generally includes large main airflow openings (or chutes) arranged radially offset from the trapped vortex cavity, and generally aligned with the main combustion chamber so as to provide a primary airflow into the main combustion chamber.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Figure 1:
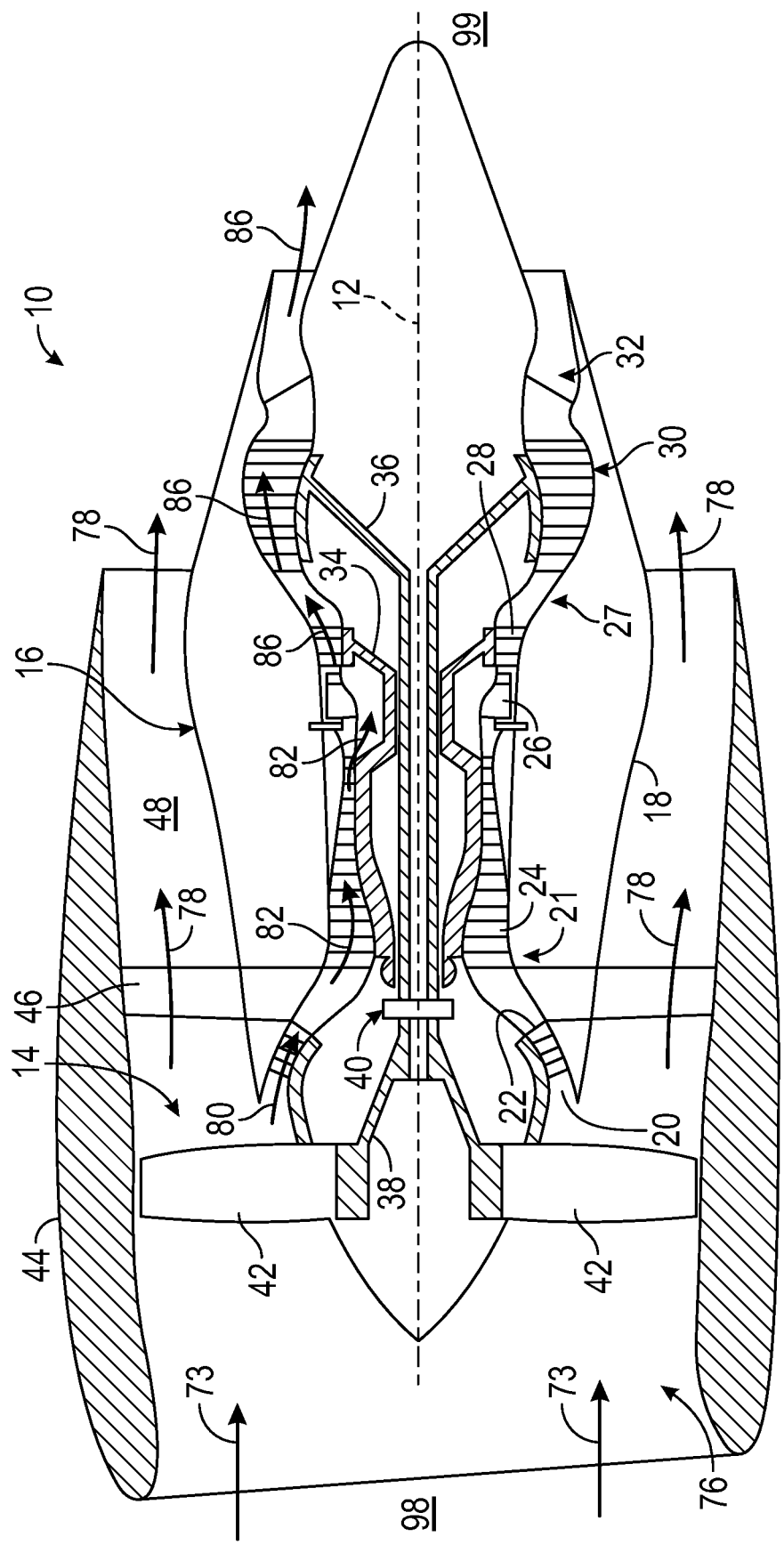
FIG. 1 is a schematic partial cross-sectional side view of an exemplary high by-pass turbofan jet engine, according to an aspect of the present disclosure.

Features, advantages, and embodiments of the present disclosure are set forth, or apparent from, a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Gas turbine engines are known to include a trapped vortex-type combustor. In a trapped vortex-type combustor, the combustor includes a trapped vortex cavity and a main combustion chamber that leads to a turbine inlet of a turbine section of the gas turbine. At an upstream side of the combustor, a dome may include vortex generating airflow openings on an upstream side of the trapped vortex cavity, and a combustor liner may also include vortex generating openings downstream of the dome. Air provided to the combustor from a compressor flows through the vortex generating openings in the dome and the liner so as to generate a vortex airflow within the trapped vortex cavity. In addition, the dome generally includes large main airflow openings (or chutes) arranged radially offset from the trapped vortex cavity, and generally aligned with the main combustion chamber so as to provide a primary airflow into the main combustion chamber. As a result, the dome is required to be configured to accommodate the large chutes, which may be more difficult to attach to the combustor in a case when, for example, a ceramic matrix composite (CMC) combustor dome and/or liners are implemented. In addition, the large primary airflow from forward to aft through the main combustion chamber may flow directly into the turbine section, resulting in a less efficient combustion.

The present disclosure addresses the foregoing by providing a trapped vortex combustor that is also a reverse flow combustor. According to the present disclosure, a combustor has a first dome structure (on a forward side of the combustor) that includes a plurality of first-dome vortex driver airflow openings, and a second dome structure (on an aft side of the combustor) that includes a plurality of second-dome vortex driver airflow openings, and a plurality of primary driver airflow openings. A vortex generating airflow is provided through both the first-dome vortex generating airflow openings and through the second-dome vortex generating airflow openings, thereby generating a first vortex flow within a trapped vortex cavity of the combustor. A primary driver airflow flows through the second dome in an aft-to-forward manner, and is then reversed in direction by the first dome structure to flow in a forward-to-aft direction through the combustor. As a result, the primary driver airflow through the combustor is better mixed with combustion products within the combustion chamber, rather than flowing directly through the combustion chamber to the turbine section.

Referring now to the drawings, FIG. 1 is a schematic partial cross-sectional side view of an exemplary high by-pass turbofan jet engine 10 as may incorporate various aspects of the present disclosure. Although further described below with reference to a ducted turbofan engine, the present disclosure is also applicable to turbomachinery in general, including turbojet, turboprop, and turboshaft gas turbine engines, including marine turbine engines, industrial turbine engines, and auxiliary power units. In addition, the present disclosure is not limited to ducted fan type turbine engines, such as that shown in FIG. 1, but can be implemented in unducted fan (UDF) type turbine engines. As shown in FIG. 1, engine 10 has a longitudinal axial centerline axis 12 that extends therethrough from an upstream end 98 to a downstream end 99 for reference purposes. In general, engine 10 may include a fan assembly 14 and a core engine 16 disposed downstream from the fan assembly 14.

The core engine 16 may generally include an outer casing 18 that defines an annular inlet 20 for providing a flow of inlet air to the core engine 16. The outer casing 18 encases, or at least partially forms, in serial flow relationship, a compressor section 21 having a low pressure (LP) compressor 22 and a high pressure (HP) compressor 24, a combustor 26, a turbine section 27 including a high pressure (HP) turbine 28 and a low pressure (LP) turbine 30, and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. The LP rotor shaft 36 may also be connected to a fan shaft 38 of the fan assembly 14 by way of a reduction gear 40, such as in an indirect-drive or a geared-drive configuration.

As shown in FIG. 1, the fan assembly 14 includes a plurality of fan blades 42 that are coupled to, and that extend radially outwardly from, the fan shaft 38. An annular fan casing or a nacelle 44 circumferentially surrounds the fan assembly 14 and/or at least a portion of the core engine 16. In one aspect, the nacelle 44 may be supported relative to the core engine 16 by a plurality of circumferentially spaced outlet guide vanes or struts 46. Moreover, at least a portion of the nacelle 44 may extend over an outer portion of the core engine 16 so as to define a bypass airflow passage 48 therebetween.

Figure 2:
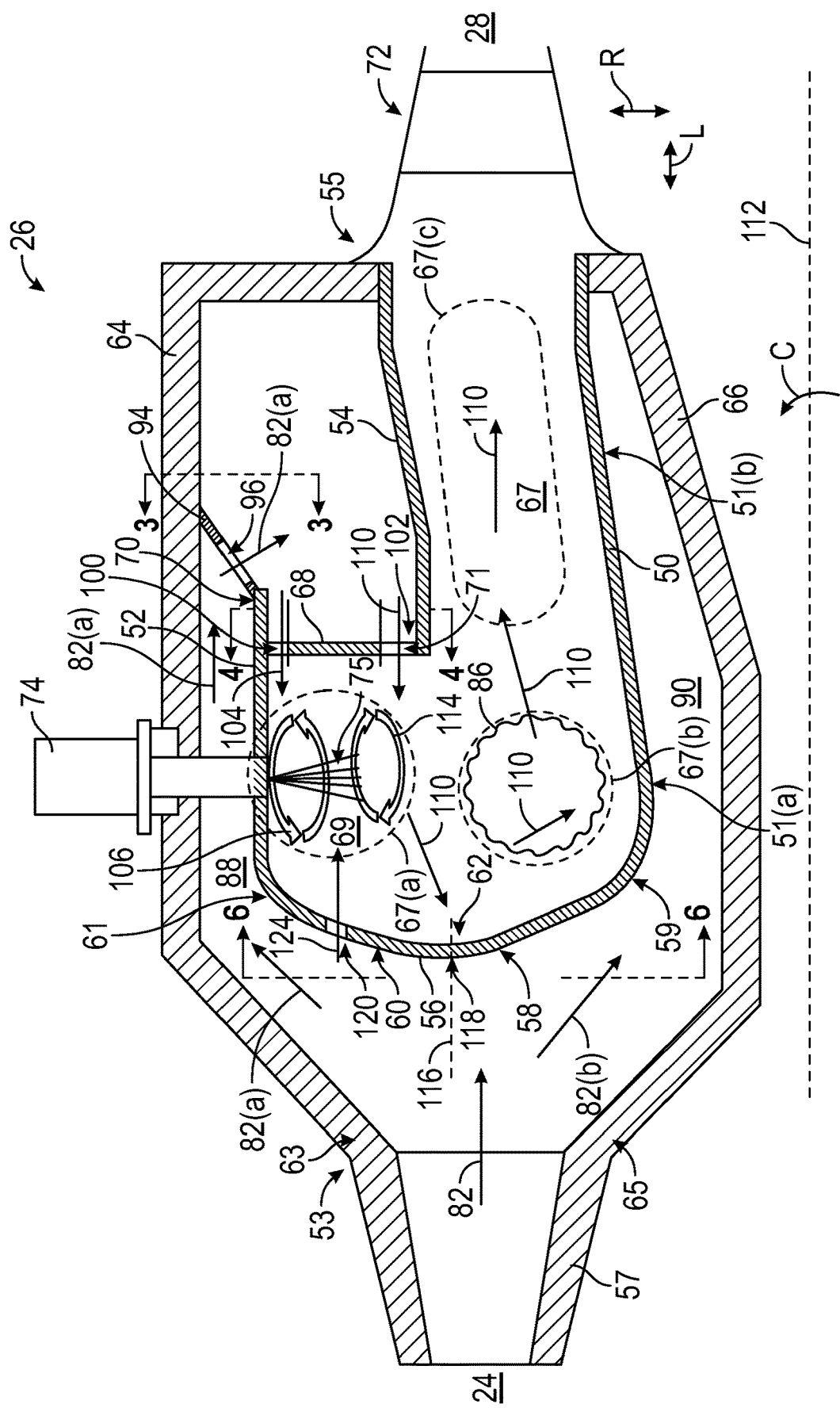
FIG. 2 is a partial cross-sectional side view of an exemplary combustor, according to an aspect of the present disclosure.

FIG. 2 is a partial cross-sectional side view of an exemplary combustor 26 of the core engine 16 as shown in FIG. 1. FIG. 2 depicts a longitudinal combustor centerline axis 112 that may generally correspond to the longitudinal axial centerline axis 12. Thus, the combustor 26 of FIG. 2 defines a combustor longitudinal direction (L) corresponding to the combustor centerline axis 112, a combustor radial direction (R) extending outward from the combustor centerline axis 112, and a combustor circumferential direction (C) extending circumferentially about the combustor centerline axis 112. The combustor 26 extends from an upstream end 53 of the combustor 26 to a downstream end 55 of the combustor 26. The upstream end 53 of the combustor 26 may be in airflow communication with a diffuser 57 that is in airflow communication with the high pressure compressor 24. The diffuser 57, in one aspect, may be arranged between an upstream end 63 of an outer casing 64 of the combustor 26 and an upstream end 65 of an inner casing 66 of the combustor 26. The downstream end 55 of the combustor 26 is in airflow communication with a turbine nozzle 72 that is in airflow communication with the high pressure turbine 28. The outer casing 64 may extend circumferentially about the longitudinal combustor centerline axis 112 and may extend longitudinally from the upstream end 53 of the combustor 26 to the downstream end 55 of the combustor 26. The inner casing 66 may also extend circumferentially about the longitudinal combustor centerline axis 112 and may extend longitudinally from the upstream end 53 of the combustor 26 to the downstream end 55 of the combustor 26.

The combustor 26 further includes a first dome structure 56 that may include an inner dome portion 58 and an outer dome portion 60. Together, the inner dome portion 58 and the outer dome portion 60 define a turn portion 62 that may be generally a convex-shaped curve that forms a flow path for directing the flow of combustion products within the combustor 26. In addition, the convex-shaped curve of the first dome structure 56 may assist in guiding a compressed air 82(*a*) to flow to an outer flow passage 88, and assist in guiding a compressed air 82(*b*) to flow to an inner flow passage 90. The convex-shaped curve of the first dome structure 56 may therefore help to reduce pressure losses in the flow of the compressed air 82(*a*) and the compressed air 82(*b*) that may otherwise occur when a more blunt-shaped dome structure is implemented. A forward outer liner 52 may extend downstream from an outer end 61 of the first dome structure 56, and an inner liner 50 may extend downstream from an inner end 59 of the first dome structure 56. The forward outer liner 52 and the inner liner 50 may be formed integral with the first dome structure 56 (e.g., formed of a continuous structural material, such as a formed ceramic matrix composite (CMC) structure), or may be joined to the first dome structure 56 via, for example, a mechanical connection (e.g., a bolted connection), or bonded via, for example, brazing. The combustor 26 further includes a second dome structure 68 arranged downstream of the first dome structure 56. The second dome structure 68 extends radially inward from a downstream end 70 of the forward outer liner 52. An aft outer liner 54 is arranged radially (i.e., in the radial direction R) between the forward outer liner 52 and the inner liner 50, and extends downstream from an inner end 71 of the second dome structure 68. Together, the first dome structure 56, the inner liner 50, the forward outer liner 52, the second dome structure 68, and the aft outer liner 54 define a combustion chamber 67. In addition, the first dome structure 56, the forward outer liner 52, and the second dome structure 68 define a trapped vortex cavity 69. As will be described in more detail below, the combustion chamber 67 may generally include a primary combustion zone 67(*a*) (corresponding to the trapped vortex cavity 69), a secondary combustion zone 67(*b*) radially inward of the primary combustion zone 67(*a*) and defined by the first dome structure 56 and an upstream portion 51(*a*) of the inner liner 50, and a tertiary combustion zone 67(*c*) defined between the aft outer liner 54 and a downstream portion 51(*b*) of the inner liner 50. The outer flow passage 88 is defined between the outer casing 64 and the forward outer liner 52, and the inner flow passage 90 is defined between the inner casing 66 and the inner liner 50. A fuel nozzle assembly 74 may be connected to the outer casing 64, and may extend through the outer casing 64 and through the forward outer liner 52 to provide a flow of fuel 75 to the combustion chamber 67.

Figure 3:
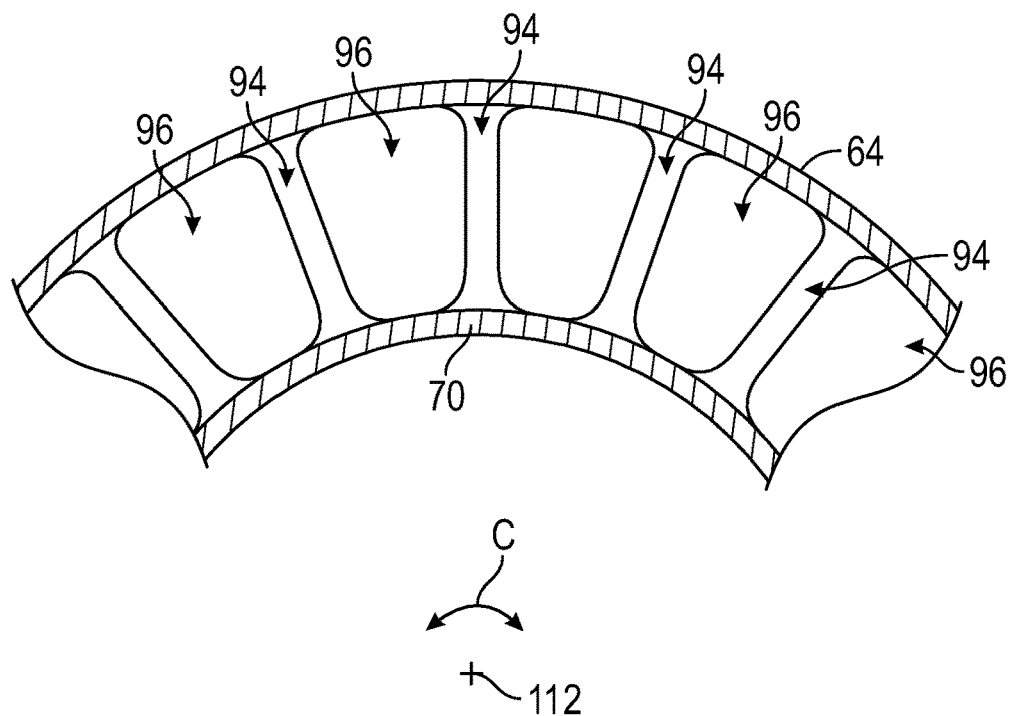
FIG. 3 is a partial cross-sectional forward-looking view of a portion of the combustor, taken at plane 3-3 of FIG. 2, according to an aspect of the present disclosure.

In addition, a plurality of support arms 94 may be provided in the outer flow passage 88 at the downstream end 70 of the forward outer liner 52. FIG. 3 is a partial cross-sectional forward-looking view, taken at plane 3-3 of FIG. 2, depicting the plurality of support arms 94. As seen in FIG. 3, the plurality of support arms 94 may be spaced apart circumferentially about the combustor centerline axis 112. A plurality of support windows 96 are arranged between the plurality of support arms 94 to allow the flow of the compressed air 82(*a*) (FIG. 2) to flow therethrough.

Referring to FIG. 1 and FIG. 2 collectively, in operation, air 73 enters the nacelle 44 at a nacelle inlet 76, and a portion of the air 73 enters the annular inlet 20 to the compressor section 21 as a compressor inlet air flow 80, where it is compressed to form compressed air 82. Another portion of the air 73 is propelled by the fan assembly 14 and enters the bypass airflow passage 48, thereby providing a bypass airflow 78 to provide the main thrust source for the engine 10. In FIG. 2, the compressed air 82 from the compressor section 21 enters the combustor 26 via the diffuser 57 as an inlet airflow. A portion of the compressed air 82, shown schematically as compressed air 82(*a*), flows into the outer flow passage 88, while another portion of the compressed air 82, shown schematically as compressed air 82(*b*), flows into the inner flow passage 90. As will be described in more detail below, the compressed air 82(*a*) in the outer flow passage 88 passes through openings in the first dome structure 56 and the second dome structure 68 into the combustion chamber 67 to mix with the fuel 75 that is injected by the fuel nozzle assembly 74 to form a fuel-air mixture that is then ignited and burned in the combustion chamber 67 to generate combustion products 86. The combustion products 86 then flow further downstream through the combustion chamber 67 into the HP turbine 28 and the LP turbine 30 (FIG. 1) via the turbine nozzle 72.

Figure 4A:
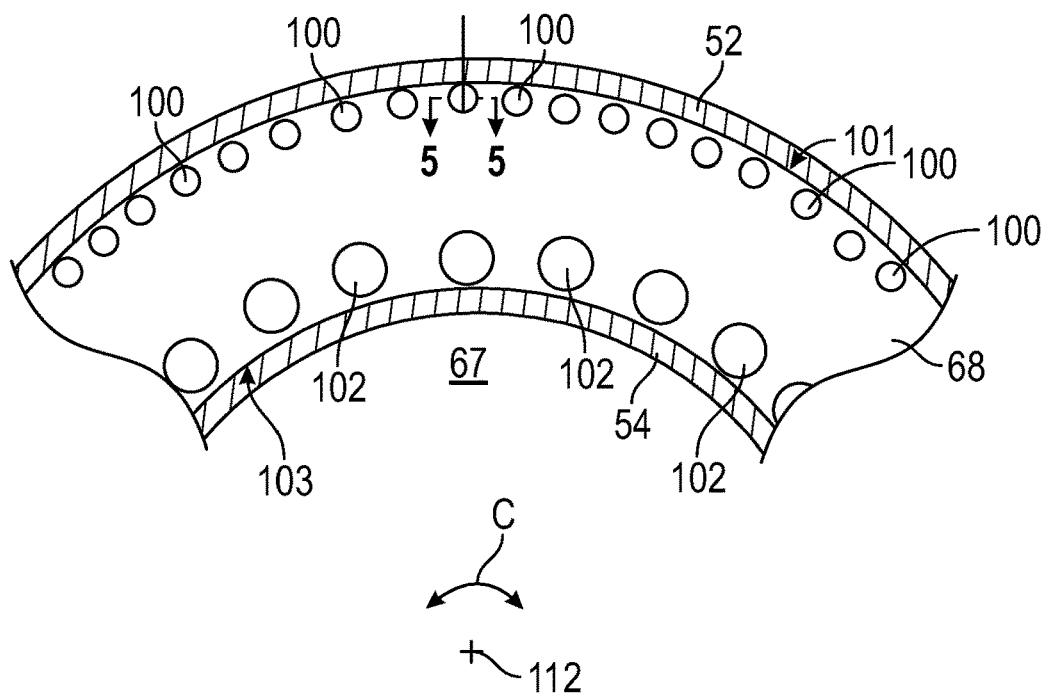
FIG. 4A is a partial cross-sectional side view of a portion of the combustor, taken at plane 4-4 of FIG. 2, according to an aspect of the present disclosure.

FIG. 4A is a partial cross-sectional side view of a portion of the combustor 26, taken at view 4-4 of FIG. 2, according to an aspect of the present disclosure. In FIG. 4A, the second dome structure 68 is seen to include a plurality of second-dome vortex driver airflow openings 100. The plurality of second-dome vortex driver airflow openings 100 may be arranged at a radially outer end 101 of the second dome structure 68 adjacent to the forward outer liner 52, and may be circumferentially spaced apart with respect to the combustor centerline axis 112. Each one of the plurality of second-dome vortex driver airflow openings 100 provides a first vortex generating outer airflow 104 (FIG. 2) therethrough to the trapped vortex cavity 69 (FIG. 2) so as to generate, at least in part, a first trapped vortex flow 106 (FIG. 2) within the trapped vortex cavity 69. A size of each of the plurality of second-dome vortex driver airflow openings 100, the number of the plurality of second-dome vortex driver airflow openings 100, and/or the circumferential spacing between respective ones of the plurality of second-dome vortex driver airflow openings 100, may be based on a desired amount of vortex driver airflow desired to generate the first trapped vortex flow 106 within the trapped vortex cavity 69. In addition, while FIG. 4A depicts the plurality of second-dome vortex driver airflow openings 100 as being generally circular openings, other shapes may be implemented for the openings instead. For example, the plurality of second-dome vortex driver airflow openings 100 may be oval-shaped slots.

Figure 5A:
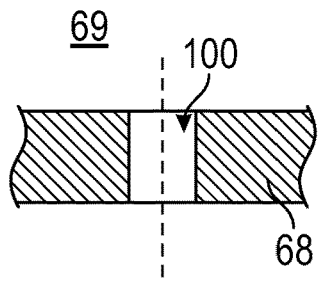
FIG. 5A is a partial cross-sectional view of a second-dome vortex driver airflow opening, taken at plane 5-5 of FIG. 4A, according to an aspect of the present disclosure.
Figure 5B:
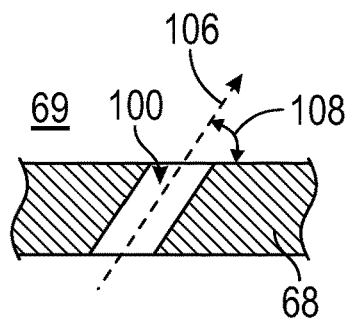
FIG. 5B is an alternate arrangement of the second-dome vortex driver airflow opening from that depicted in FIG. 5A, according to an aspect of the present disclosure.

FIG. 5A is a partial cross-sectional view of a second-dome vortex driver airflow opening 100, taken at plane 5-5 of FIG. 4A, according to an aspect of the present disclosure. In FIG. 5A, the second-dome vortex driver airflow opening 100 is shown as being arranged perpendicular to the second dome structure 68. FIG. 5B is an alternate arrangement of the second-dome vortex driver airflow opening 100 from that depicted in FIG. 5A. In FIG. 5B, the second-dome vortex driver airflow opening 100 is shown as being arranged at an angle 108 through the second dome structure 68. Each of the second-dome vortex driver airflow openings 100 may be arranged at the angle 108. When the second-dome vortex driver airflow openings 100 are arranged at the angle 108, a swirled flow of the first trapped vortex flow 106 may be introduced into the trapped vortex cavity 69 so as to induce a circumferential swirl to the first trapped vortex flow 106. The angle 108 may be determined based on a desired amount of swirl to be induced to the first trapped vortex flow 106.

Referring back to FIG. 4A, the second dome structure 68 also includes a plurality of primary driver airflow openings 102 for providing a primary driver airflow 110 (FIG. 2) therethrough into the combustion chamber 67. The plurality of primary driver airflow openings 102 may be arranged at a radially inner end 103 of the second dome structure 68 adjacent to the aft outer liner 54, and may be circumferentially spaced apart with respect to the combustor centerline axis 112. The primary driver airflow 110 functions, at least in part, as the main driver airflow within the combustion chamber 67 for driving the combustion within the combustion chamber 67 by mixing with the fuel 75 to generate a fuel/air mixture within the combustion chamber 67 that is ignited and burned within the combustion chamber 67. Additionally, as will be described below, the primary driver airflow 110 may, in part, provide for generating a second trapped vortex flow 114 (FIG. 2) radially inward of the first trapped vortex flow 106 (FIG. 2) within the trapped vortex cavity 69 (FIG. 2). A size of each of the plurality of the primary driver airflow openings 102, and/or the number of the plurality of primary driver airflow openings 102, may be based on a desired amount of the primary driver airflow 110 desired within the combustion chamber 67. In addition, similar to the second-dome vortex driver airflow openings 100 as shown in FIG. 4A, the plurality of primary driver airflow openings 102 may be generally circular openings, or may be other shapes instead. Further, similar to the second-dome vortex driver airflow openings 100 as shown in FIGS. 5A and 5B, the plurality of primary driver airflow openings 102 may be arranged perpendicular to the second dome structure 68 or may be arranged at an angle through the second dome structure 68.

Figure 4B:
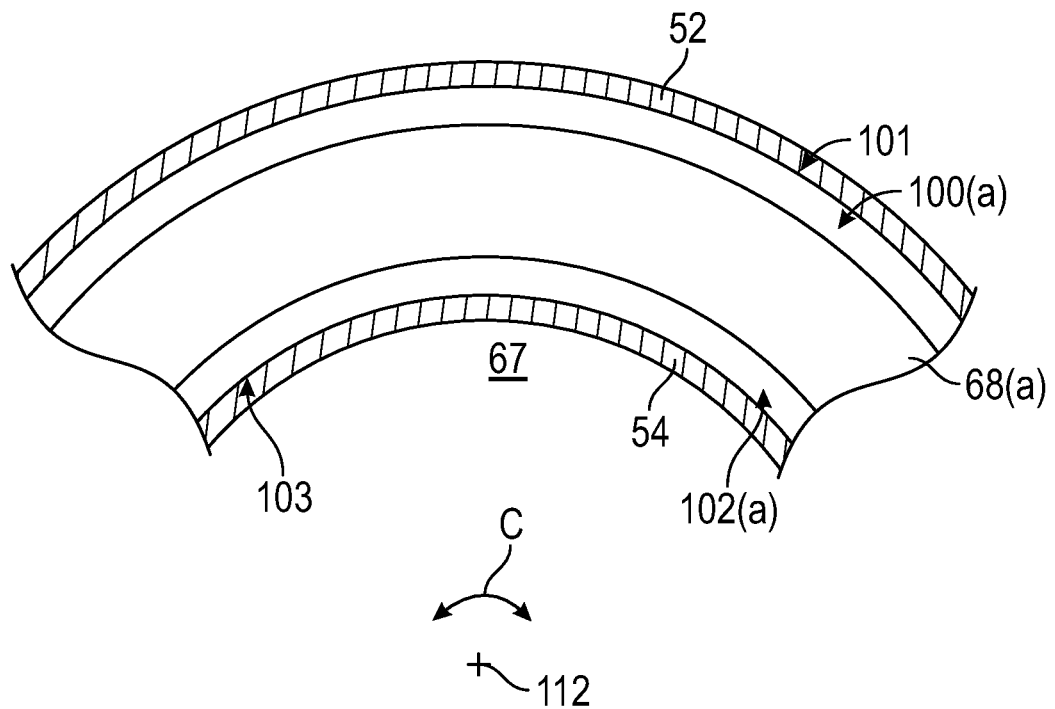
FIG. 4B is an alternate partial cross-sectional side view to that of FIG. 4A of a portion of a combustor, according to an aspect of the present disclosure.
Figure 4C:
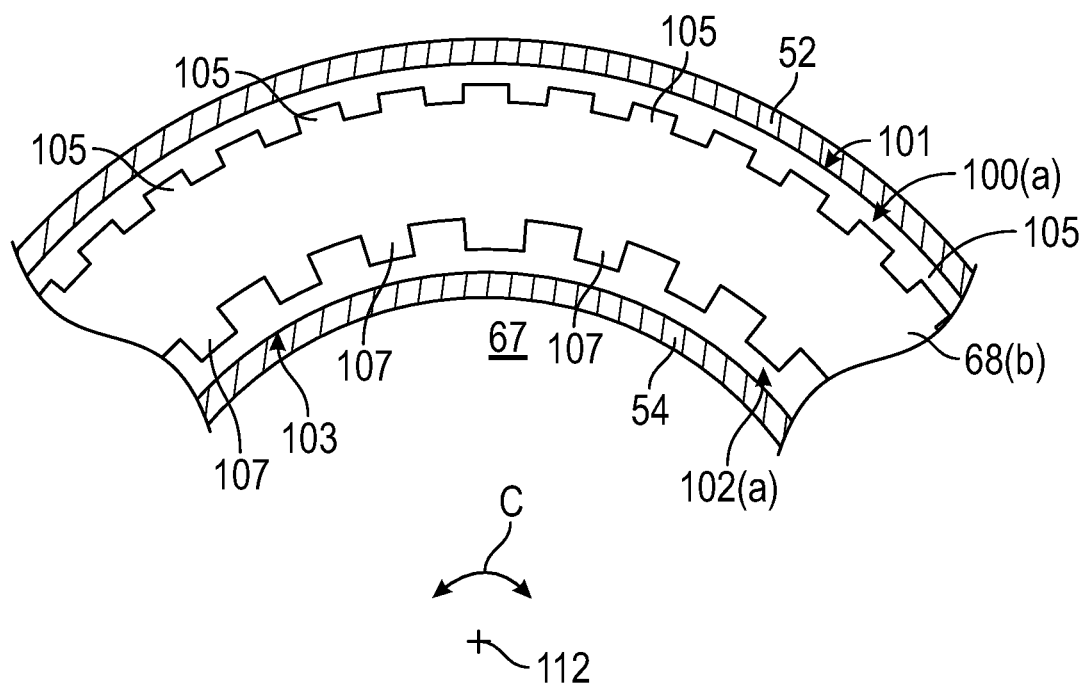
FIG. 4C is another alternate partial cross-sectional side view to that of FIG. 4A of a portion of a combustor, according to an aspect of the present disclosure.

FIG. 4B and FIG. 4C are partial cross-sectional forward-looking views of alternate arrangements to that of FIG. 4A of the second dome structure 68. In the FIG. 4B aspect, rather than the second dome structure 68 including the plurality of second dome vortex airflow openings 100 as in FIG. 4A, a second dome structure 68(*a*) may include an outer annular slotted opening 100(*a*) at the radially outer end 101 to provide the first vortex generating outer airflow 104 (FIG. 2) therethrough to the trapped vortex cavity 69 (FIG. 2). The outer annular slotted opening 100(*a*) may extend circumferentially about the combustor centerline axis 112, and may have either a uniform height circumferentially, or may have a varying height circumferentially. Similarly, the second dome structure 68(*a*) of FIG. 4B may include an inner annular slotted opening 102(*a*) at the radially inner end 103 to provide the primary driver airflow 110 therethrough to the trapped vortex cavity 69. The inner annular slotted opening 102(*a*) may also extend circumferentially about the combustor centerline axis 112, and may also have either a uniform height circumferentially, or may have a varying height circumferentially. In the FIG. 4B configuration, as well as the FIG. 4C configuration described below, the second dome structure 68(*a*) may be supported by being connected to braces (not shown) that may be connected to the forward outer liner 52 and the after outer liner 54, where the braces may be arranged spaced apart from one another about the combustor centerline axis 112. FIG. 4C is similar to the FIG. 4B aspect in that a second dome structure 68(*b*) includes the outer annular slotted opening 100(*a*) and the inner annular slotted opening 102(*a*), but also includes a plurality of outer castellations 105 arranged at the outer annular slotted opening 100(*a*) and a plurality of inner castellations 107 arranged at the inner annular slotted opening 102(*a*). The outer castellations 105 may provide for a circumferentially varying first vortex generating outer airflow 104 into the primary combustion zone 67(*a*), while the inner castellations 107 may provide for a circumferentially varying primary driver airflow 110 into the primary combustion zone 67(*a*).

Figure 6:
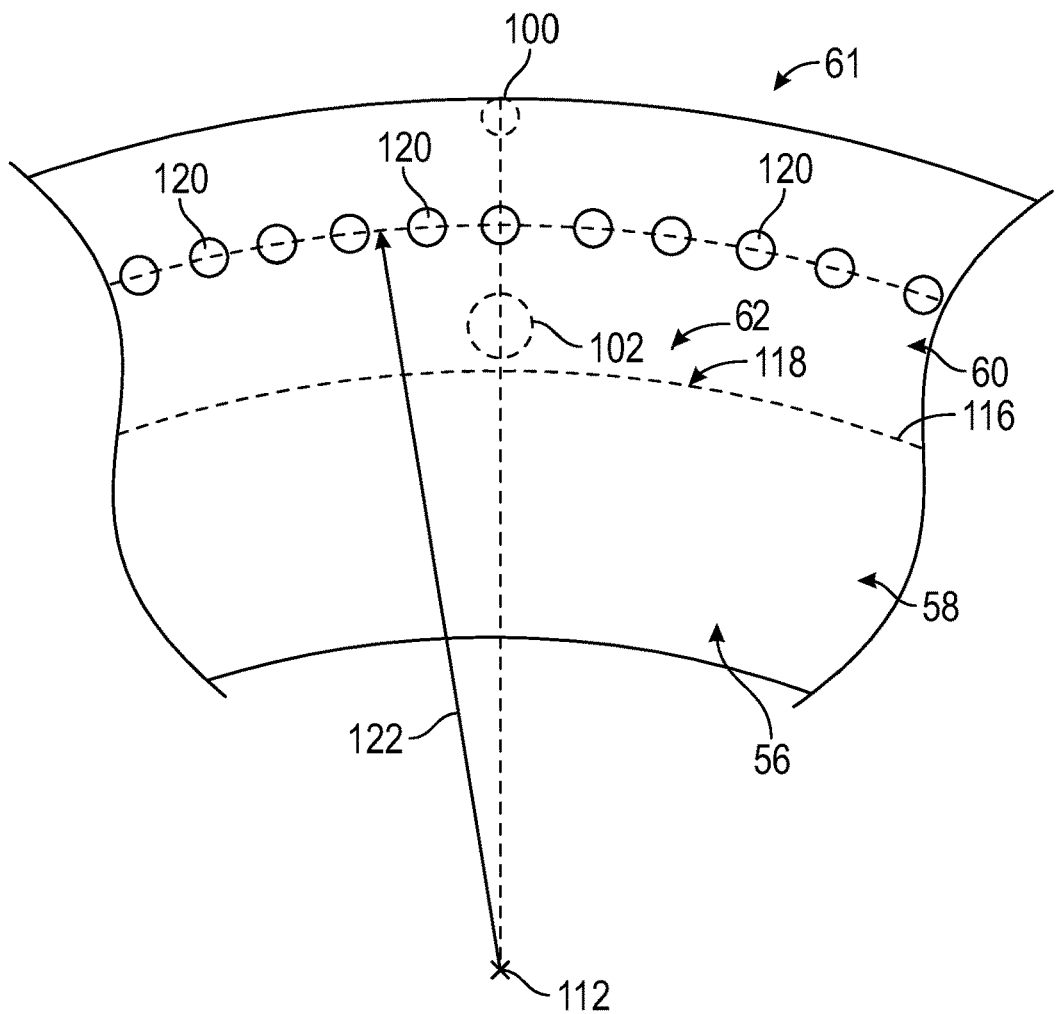
FIG. 6 is an aft-looking partial view of the first dome structure, taken at view 6-6 of FIG. 2, according to an aspect of the present disclosure.

FIG. 6 is an aft-looking partial view of the first dome structure 56, taken at view 6-6 of FIG. 2, according to an aspect of the present disclosure. As was discussed above, the first dome structure 56 includes the inner dome portion 58 and the outer dome portion 60. A circumferential centerline 116 may divide the first dome structure 56 into the inner dome portion 58 and the outer dome portion 60, and a curvature apex 118 (see also, FIG. 2) may be defined along the circumferential centerline 116. As was discussed above with regard to FIG. 2, the inner dome portion 58 and the outer dome portion 60 may define a convex curve that defines the turn portion 62, and the curvature apex 118 may define an apex of the convex curve of the turn portion 62. Referring collectively to FIG. 2 and to FIG. 6, the first dome structure 56 includes a plurality of first-dome vortex driver airflow openings 120 therethrough. The plurality of first-dome vortex driver airflow openings 120 may be arranged through the outer dome portion 60 at a radial distance 122 from the combustor centerline axis 112 so that they are arranged radially inward of the second-dome vortex driver airflow openings 100 and radially outward of the primary driver airflow openings 102. For reference purposes, a radial location of the second-dome vortex driver airflow openings 100 and a radial location of the primary driver airflow openings 102 in relation to the combustor centerline axis 112 are shown in FIG. 6 with dashed lines. Similar to the second-dome vortex driver airflow openings 100, the first-dome vortex driver airflow openings 120 may be circumferentially spaced apart with respect to the combustor centerline axis 112. Each one of the plurality of first-dome vortex driver airflow openings 120 provides a first vortex generating mid airflow 124 (FIG. 2) therethrough to the trapped vortex cavity 69 so as to generate, at least in part, the first trapped vortex flow 106 within the trapped vortex cavity 69, in conjunction with the first vortex generating outer airflow 104 through the plurality of second-dome vortex driver airflow openings 100. In addition, the first vortex generating mid airflow 124 may, in conjunction with the primary driver airflow 110 through the primary driver airflow openings 102, generate the second trapped vortex flow 114 radially inward of the first trapped vortex flow 106 within the trapped vortex cavity 69. A size of each of the plurality of first-dome vortex driver airflow openings 120, and/or the number of the plurality of first-dome vortex driver airflow openings 120, may also be based on the desired amount of vortex driver airflow desired to generate the first trapped vortex flow 106 within the trapped vortex cavity 69. In addition, while FIG. 6 depicts the plurality of first-dome vortex driver airflow openings 120 as being generally circular openings, other shapes may be implemented for the openings instead. For example, similar to the plurality of second-dome vortex driver airflow openings 100, the plurality of first-dome vortex driver airflow openings 120 may be oval-shaped slots. In addition, the first-dome vortex driver airflow openings 120 may be arranged similar to the second-dome vortex driver airflow openings 100 as shown in either of FIG. 5A or FIG. 5B.

Referring back to FIG. 2, in operation, the diffuser 57 receives the compressed air 82 as an inlet airflow from the high pressure compressor 24, and a portion of the compressed air 82 flowing into the combustor 26 from the diffuser 57 flows through the plurality of first-dome vortex driver airflow openings 120 as the first vortex generating mid airflow 124. The compressed air 82(*a*) flowing in the outer flow passage 88 flows through the support windows 96 in the plurality of support arms 94, where the compressed air 82(*a*) is redirected toward the second dome structure 68. A portion of the redirected compressed air 82(*a*) flows through the second-dome vortex driver airflow openings 100 as the first vortex generating outer airflow 104. Together, the first vortex generating mid airflow 124 and the first vortex generating outer airflow 104 generate the first trapped vortex flow 106 within the trapped vortex cavity 69. The fuel 75 is injected by the fuel nozzle assembly 74 into the primary combustion zone 67(*a*), where it is ignited and burned to generate the combustion products 86. In addition, another portion of the redirected compressed air 82(*a*) flows through the primary driver airflow openings 102 as the primary driver airflow 110. Together, the primary driver airflow 110 and the first vortex generating mid airflow 124 generate the second trapped vortex flow 114 within the trapped vortex cavity 69. Since the first vortex generating outer airflow 104 and the primary driver airflow 110 are from an aft to forward flow direction, and the first vortex generating mid airflow 124 is from a forward to aft flow direction, the first trapped vortex flow 106 and the second trapped vortex flow 114 are in opposing vortex swirl directions. The primary driver airflow 110, which is the main combustion driver airflow within the combustion chamber 67, flows toward the first dome structure 56, where the primary driver airflow 110 is redirected by the turn portion 62 toward the secondary combustion zone 67(*b*). The primary driver airflow 110 mixes with the combustion products 86 and combustion products 86 reverse flow directions through the secondary combustion zone 67(*b*) toward the tertiary combustion zone 67(*c*), and then through the turbine nozzle 72. Thus, the combustor 26 defines a trapped vortex reverse flow combustor in that, both a trapped vortex flow is generated within the trapped vortex cavity 69, and a reverse flow is generated due to the primary driver airflow 110 flowing initially from aft to forward, and then being redirected by the turn portion 62 to a forward to aft flow.

Figure 7:
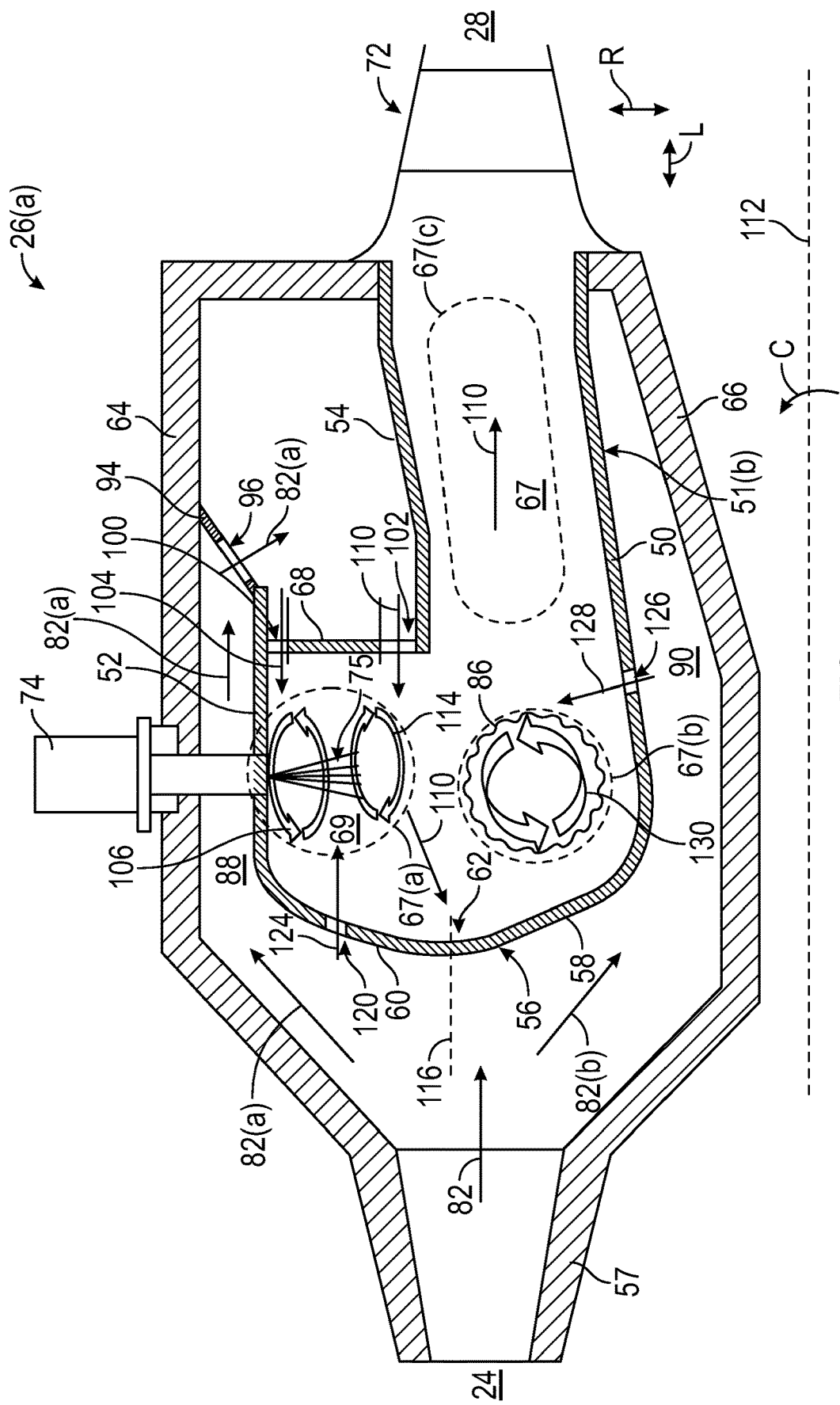
FIG. 7 is a partial cross-sectional side view of an alternate arrangement of the combustor to that shown in FIG. 2, according to another aspect of the present disclosure.

FIG. 7 is a partial cross-sectional side view of an alternate arrangement of a combustor 26(*a*) to that shown in FIG. 2, according to another aspect of the present disclosure. The FIG. 7 aspect is the similar to the FIG. 2 aspect and, therefore, like components are identified with the same reference numerals. One difference, however, between the FIG. 7 aspect and the FIG. 2 aspect is that the inner liner 50 includes a plurality of inner liner airflow openings 126 therethrough. The plurality of inner liner airflow openings 126 may be arranged in a circumferential row about the combustor centerline axis 112, and may have a size that is greater than that of both the first-dome vortex driver airflow openings 120 and the second-dome vortex driver airflow openings 100, but that is less than the size of the primary driver airflow openings 102. The plurality of inner liner airflow openings 126 need not all have a same size or shape, and may have respectively different sizes and/or shapes. In addition, the plurality of inner liner airflow openings 126 may be arranged in more than one row circumferentially about the combustor centerline axis 112, where each row may be arranged at a different axial distance along the combustor centerline axis 112. Further, respective ones of the plurality of inner liner airflow openings 126 in each row may be circumferentially offset from respective ones of the plurality of inner liner airflow openings 126 of an adjacent row. The plurality of inner liner airflow openings 126 are arranged to provide a secondary driver airflow (or dilution airflow) 128 to the secondary combustion zone 67(*b*) of the combustion chamber 67. In one aspect, the inner liner airflow openings 126 may be dilution openings and the secondary driver airflow (or dilution airflow) 128 may be a dilution jet airflow. As shown in FIG. 7, the secondary driver airflow (or dilution airflow) 128 may, in conjunction with the primary driver airflow 110 that is redirected into the secondary combustion zone 67(*b*) by the turn portion 62, generate a secondary combustion zone vortex flow 130 within the combustion chamber 67. The secondary combustion zone vortex flow 130 may provide for additional mixing of the combustion products 86 with the secondary driver airflow (or dilution airflow) 128.

In further operation of the FIG. 7 aspect as compared with the above-described operation of the FIG. 2 aspect, a portion of the inlet compressed airflow 82, and more particularly, the compressed air 82(*b*) in the outer flow passage 90, flows through the plurality of inner liner airflow openings (or dilution openings) 126 to provide a secondary driver airflow (or a dilution airflow) 128 therethrough. The primary driver airflow 110 and the secondary driver airflow 128 generating a secondary combustion zone vortex flow 130 in a secondary combustion zone 67(*b*) defined radially inward of the trapped vortex cavity 69.

Figure 8:
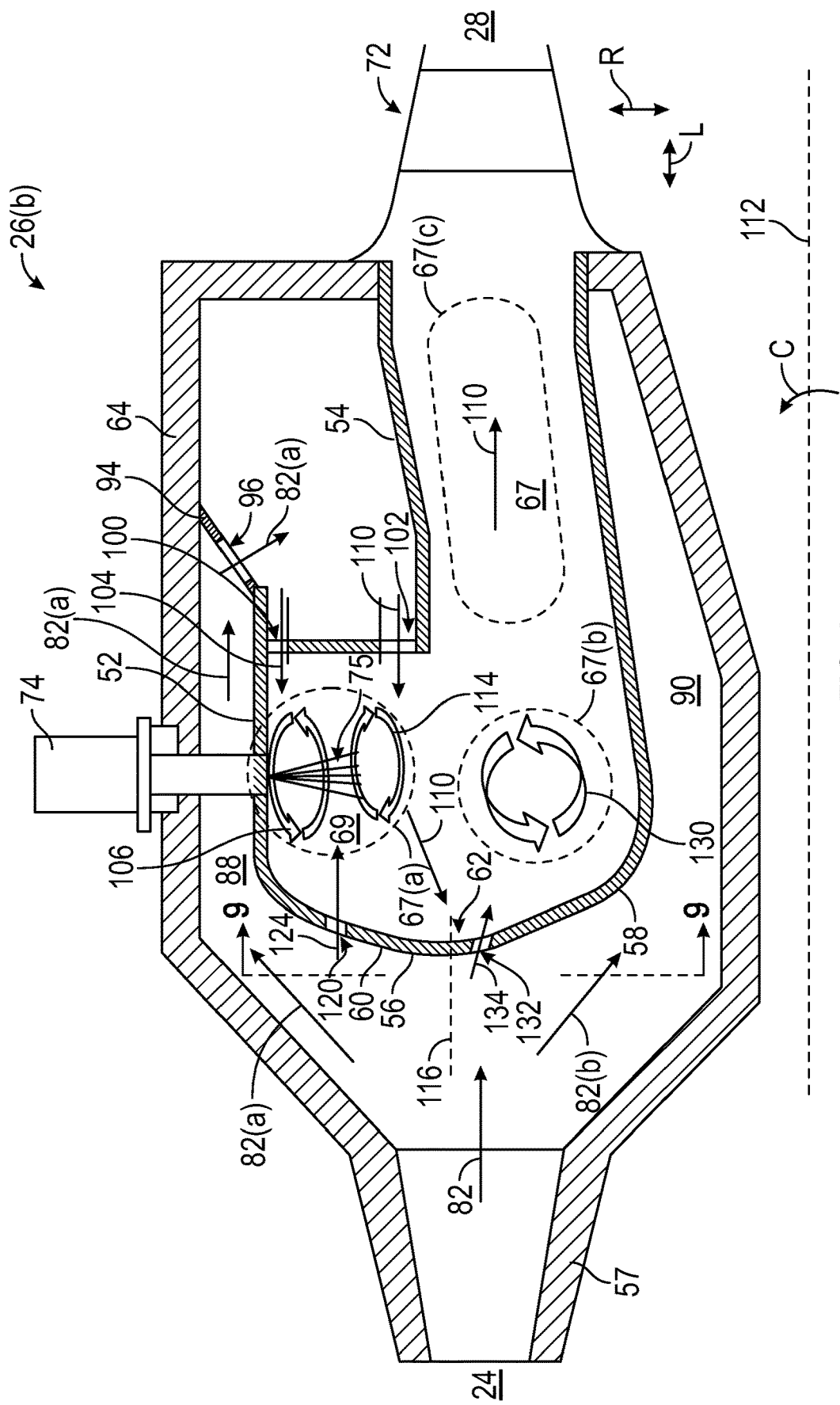
FIG. 8 is a partial cross-sectional side view of another alternate arrangement of the combustor to that shown in FIG. 2, according to another aspect of the present disclosure.

FIG. 8 is a partial cross-sectional side view of another alternate arrangement of a combustor 26(*b*) to that shown in FIG. 2, according to another aspect of the present disclosure. The FIG. 8 aspect is the similar to the FIG. 2 aspect and, therefore, like components are identified with the same reference numerals. One difference, however, between the FIG. 8 aspect and the FIG. 2 aspect is that the first dome structure 56 includes a plurality of secondary driver airflow openings 132 therethrough for providing a secondary driver airflow 134 to the secondary combustion zone 67(*b*). The plurality of secondary driver airflow openings 132 may be arranged through the inner dome portion 58. The plurality of secondary driver airflow openings 132 need not all have a same size or shape, and may have respectively different sizes and/or shapes. In addition, the plurality of secondary driver airflow openings 132 may be arranged in more than one row circumferentially about the combustor centerline axis 112, where each row may be arranged at a different radial distance from the combustor centerline axis 112. Further, respective ones of the plurality of secondary driver airflow openings 132 in each row may be circumferentially offset from respective ones of the plurality of secondary driver airflow openings 132 of an adjacent row.

Figure 9:
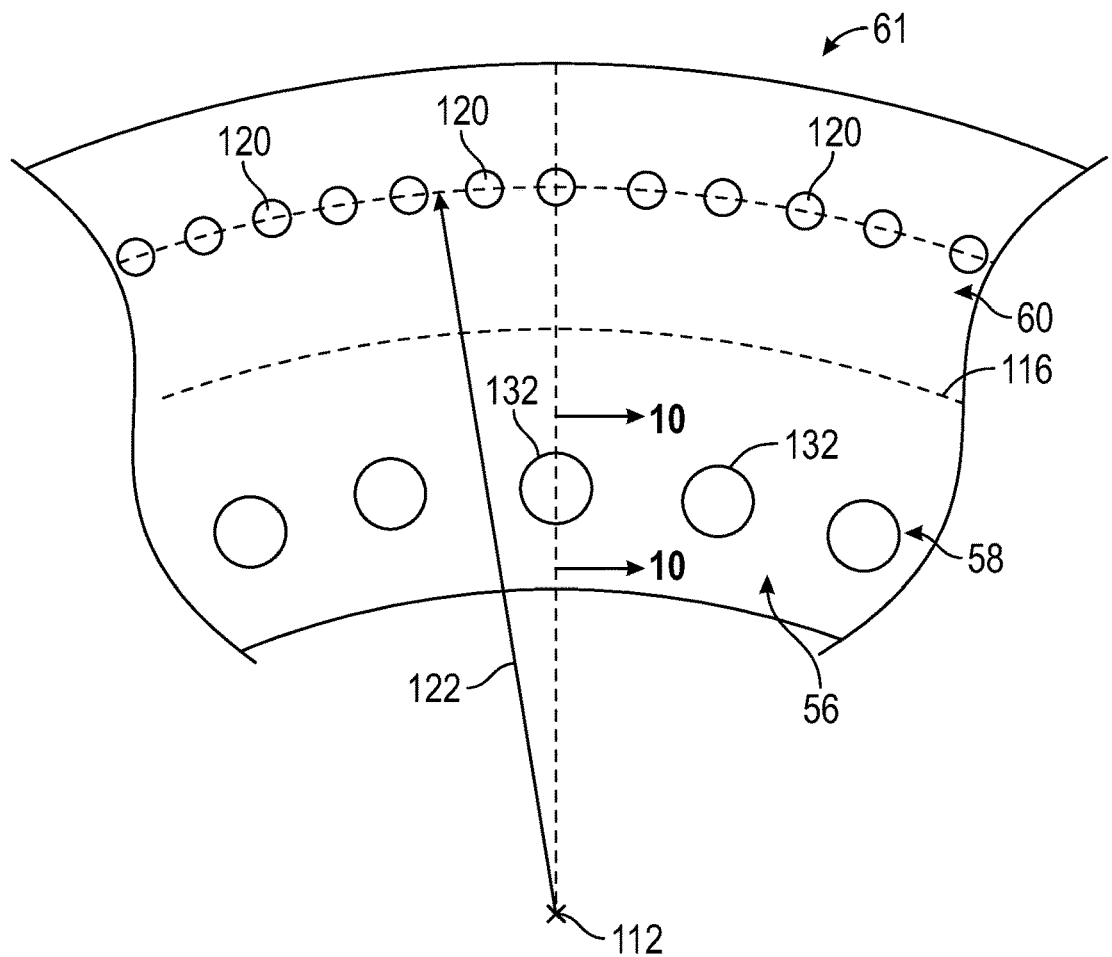
FIG. 9 is an aft looking partial view of the first dome structure taken at view 9-9 of FIG. 8, according to an aspect of the present disclosure.

FIG. 9 is an aft looking partial view of the first dome structure 56 taken at view 9-9 of FIG. 8, according to an aspect of the present disclosure. As shown in FIG. 9, the plurality of secondary driver airflow openings 132 may be circumferentially spaced apart about the combustor centerline axis 112. The plurality of secondary driver airflow openings 132 may be sized to provide the secondary driver airflow 134 so as to assist in turning the primary driver airflow 110 (FIG. 8) through the turn portion 62 (FIG. 8) into the secondary combustion zone 67(*b*) (FIG. 8). Thus, the secondary driver airflow openings 132 may have a size that is less than the primary driver airflow openings 102 (FIG. 8), but greater in size than the first-dome vortex driver airflow openings 120.

Figure 10:
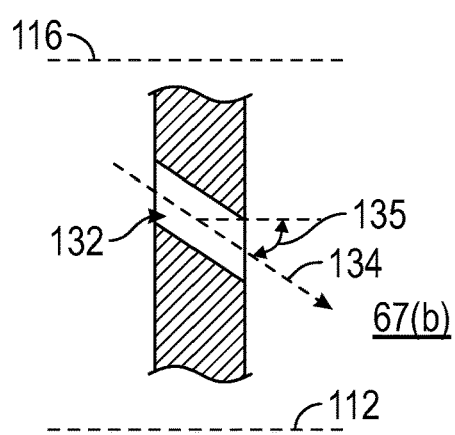
FIG. 10 is a partial cross-sectional view of the secondary driver airflow opening, taken at plane 10-10 of FIG. 9, according to an aspect of the present disclosure.

FIG. 10 is a partial cross-sectional view of the secondary driver airflow opening 132, taken at plane 10-10 of FIG. 8, according to an aspect of the present disclosure. As shown in FIG. 10, the plurality of secondary driver airflow openings 132 are arranged at an angle 135 with respect to the combustor centerline axis 112 so as to aerodynamically drive the primary driver airflow 110 (FIG. 8) through the turn portion 62 (FIG. 8) to the secondary combustion zone 67(*b*).

Figure 11:
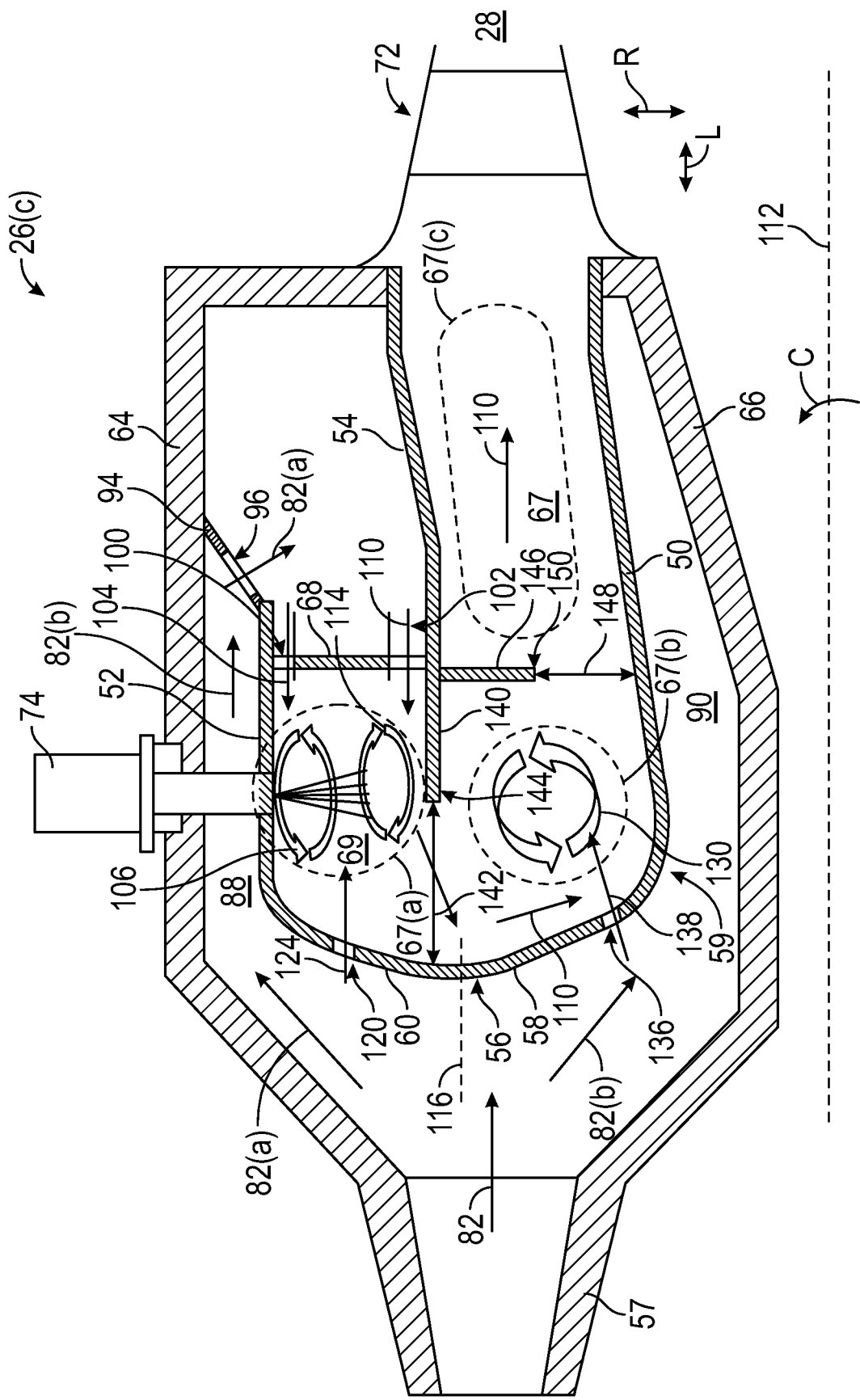
FIG. 11 is a partial cross-sectional side view of another alternate arrangement of the combustor to that shown in FIG. 8, according to another aspect of the present disclosure.

FIG. 11 is a partial cross-sectional side view of another alternate arrangement of a combustor 26(*c*) to that shown in FIG. 8, according to another aspect of the present disclosure. The FIG. 11 aspect is the similar to the FIG. 8 aspect and, therefore, like components are identified with the same reference numerals. In the FIG. 11 aspect, the first dome structure 56, similar to the FIG. 8 aspect, includes a plurality of secondary driver airflow openings 136 through the inner dome portion 58 for providing a secondary driver airflow (or dilution airflow) 138 to the secondary combustion zone 67(*b*). However, in the FIG. 11 aspect, the plurality of secondary driver airflow openings 136 are arranged near the inner end 59 of the inner dome portion 58, while the secondary driver airflow openings 132 of the FIG. 8 aspect are arranged near the circumferential centerline 116. In addition, in the FIG. 11 aspect, the aft outer liner 54 includes a first extension portion 140 extending upstream from the second dome structure 68 and extending at least partially between the trapped vortex cavity 69 and the secondary combustion zone 67(*b*). A first gap 142 is defined between an upstream end 144 of the first extension portion 140 and the first dome structure 56, where the first gap 142 provides a flow passage for the flow of the primary driver airflow 110 from the primary combustion zone 67(*a*) to the secondary combustion zone 67(*b*). Further, the aft outer liner 54 includes a second extension portion 146 extending radially inward between the secondary combustion zone 67(*b*) and the tertiary combustion zone 67(*c*). A second gap 148 is defined between a radially inner end 150 of the second extension portion 146 and the inner liner 50. The first extension portion 140 and the second extension portion 146 may provide for a structurally assisting the turning of the primary driver airflow 110 through the combustion chamber 67, and may also assist in generating the secondary combustion zone vortex flow 130 within the secondary combustion zone 67(b).

Figure 12:
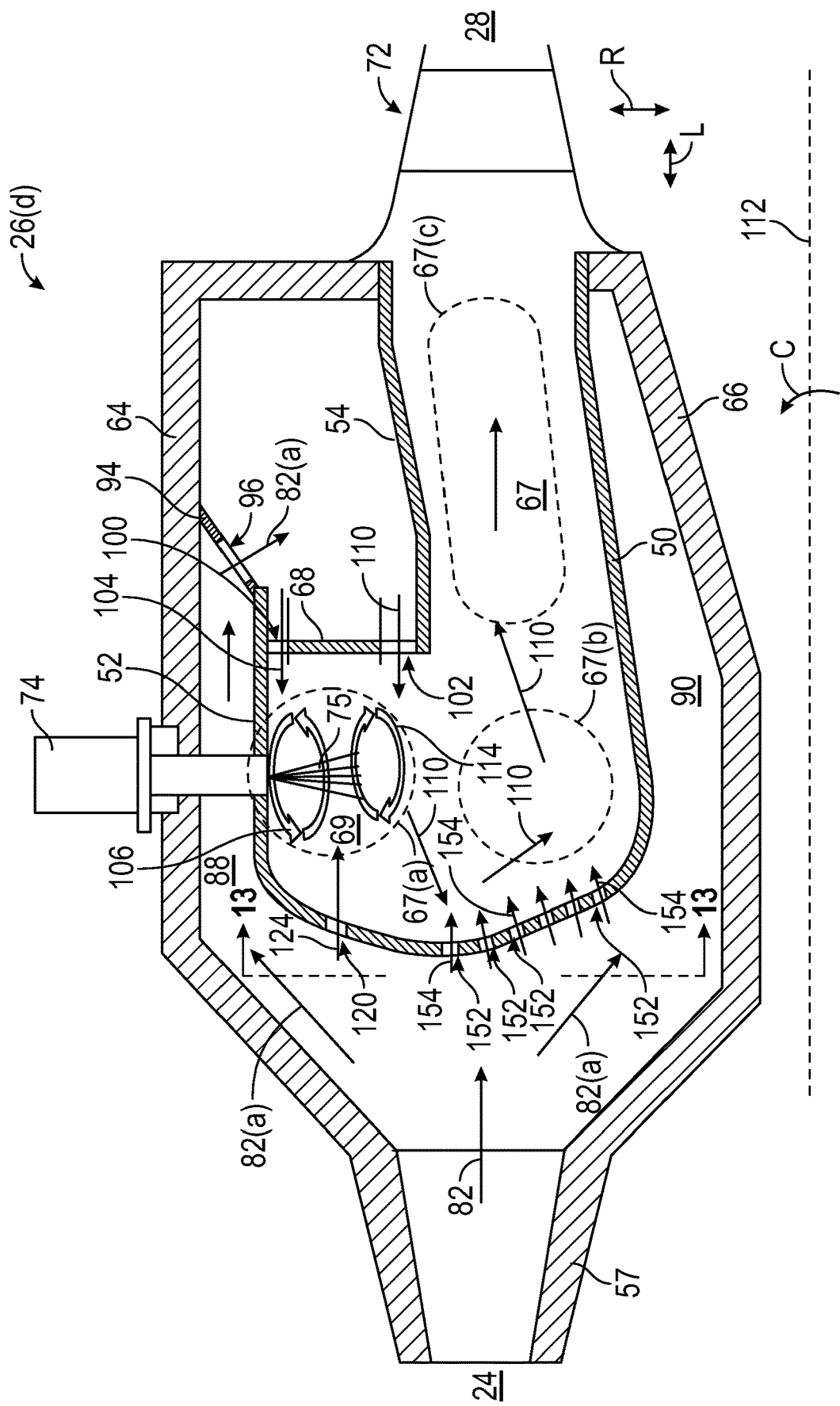
FIG. 12 is a partial cross-sectional side view of another alternate arrangement of the combustor to that shown in FIG. 2, according to another aspect of the present disclosure.

FIG. 12 is a partial cross-sectional side view of another alternate arrangement of a combustor 26(d) to that shown in FIG. 2, according to another aspect of the present disclosure. The FIG. 12 aspect is similar to the FIG. 2 aspect and, therefore, similar components are labeled with the same reference numerals. One difference, however, between the FIG. 2 aspect and the FIG. 12 aspect is the inclusion of a plurality of diffusion airflow injection openings 152 through the first dome structure 56. The diffusion airflow injection openings 152 are generally smaller in size that the first-dome vortex driver airflow openings 120 and may generally constitute the smallest sized airflow openings in the combustor 26. For example, the total amount of airflow injected into the combustion chamber 67 via the various airflow openings may include the following percentage of the total amount of airflow: the primary driver airflow 110, in a range of about ten percent to about seventy percent of the total airflow injected into the combustion chamber 67, the first vortex generating outer airflow 104 and the first vortex generating mid airflow 124, in a range of about two percent to about twenty-five percent of the total airflow, and, when applicable, for any of the secondary driver airflow 128 (FIG. 7), the secondary driver airflow 134, the secondary driver airflow 138 (FIG. 11), and the diffusion airflow 154, in a range of about five percent to about thirty percent of the total airflow. The plurality of diffusion airflow injection openings 152 provide for a diffusion airflow 154 to flow through each of the plurality of diffusion airflow injection openings 152, and the diffusion airflow 154 may provide a cooling airflow along the inner surface of the first dome structure 56. The diffusion airflow 154 may also provide for a more uniform turning of the primary driver airflow 110 at the turn portion 62.

Figure 13:
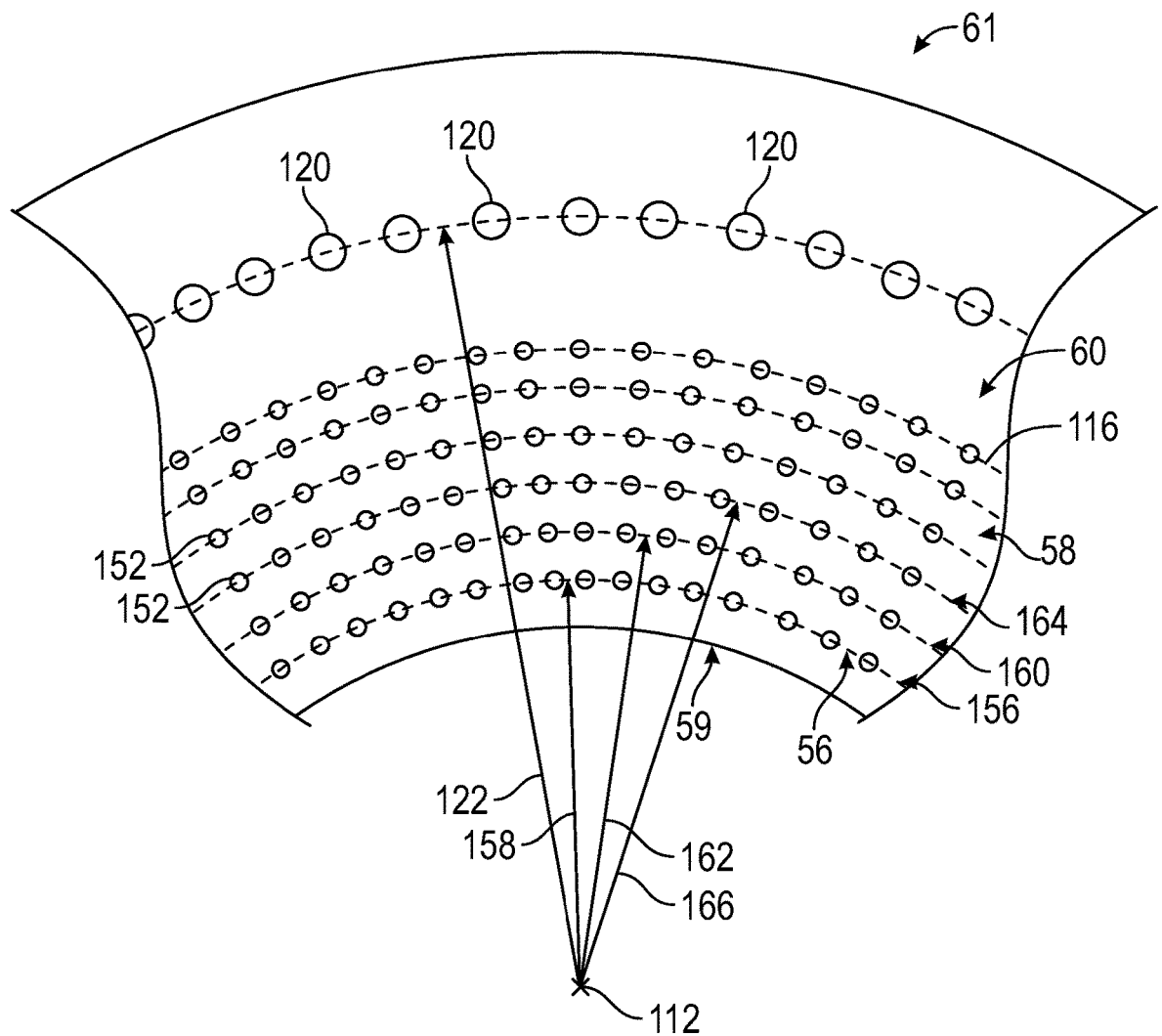
FIG. 13 is an aft looking view of the first dome structure taken at view 13-13 of FIG. 12, according to an aspect of the present disclosure.

FIG. 13 is an aft looking partial view of the first dome structure taken at view 13-13 of FIG. 12, according to an aspect of the present disclosure. As shown in FIG. 13, the plurality of diffusion airflow injection openings 152 may be arranged in a plurality of circumferential rows, including a first circumferential row 156 that may be arranged at a first radial distance 158 from the combustor centerline axis 112, a second circumferential row 160 arranged at a second radial distance 162 from the combustor centerline axis 112, and a third circumferential row 164 arranged at a third radial distance 166 from the combustor centerline axis 112. The number of circumferential rows of the diffusion airflow injection openings 152, the radial spacing of the respective circumferential rows, and the circumferential spacing between respective ones of the diffusion airflow injection openings 152 within each row, may be based on a desired amount of diffusion airflow 154 (FIG. 12) to be provided into the combustion chamber 67 (FIG. 12).

Figure 14:
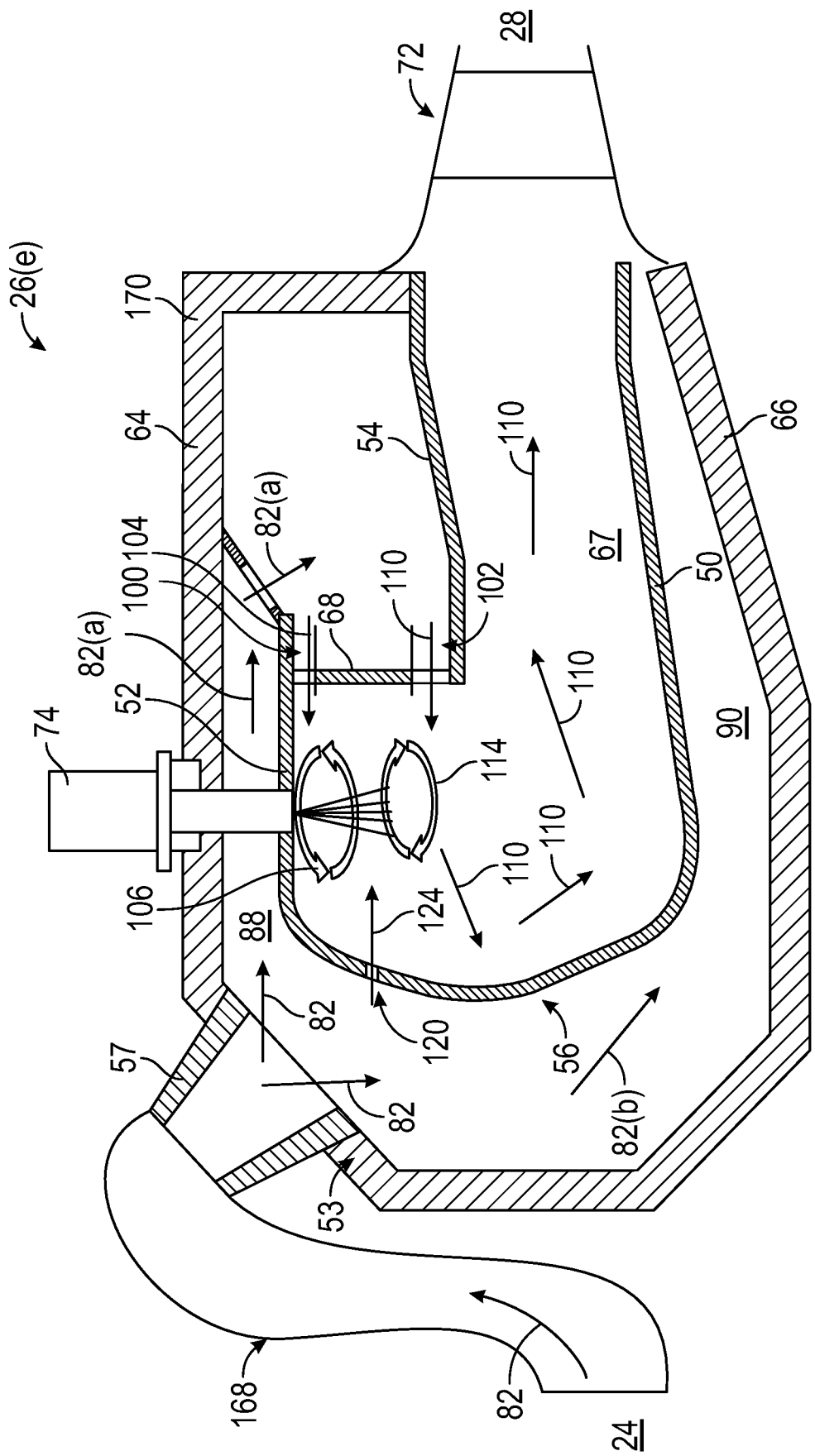
FIG. 14 is a partial cross-sectional side view of another alternate arrangement of the combustor to that shown in FIG. 2, according to another aspect of the present disclosure.
Figure 15:
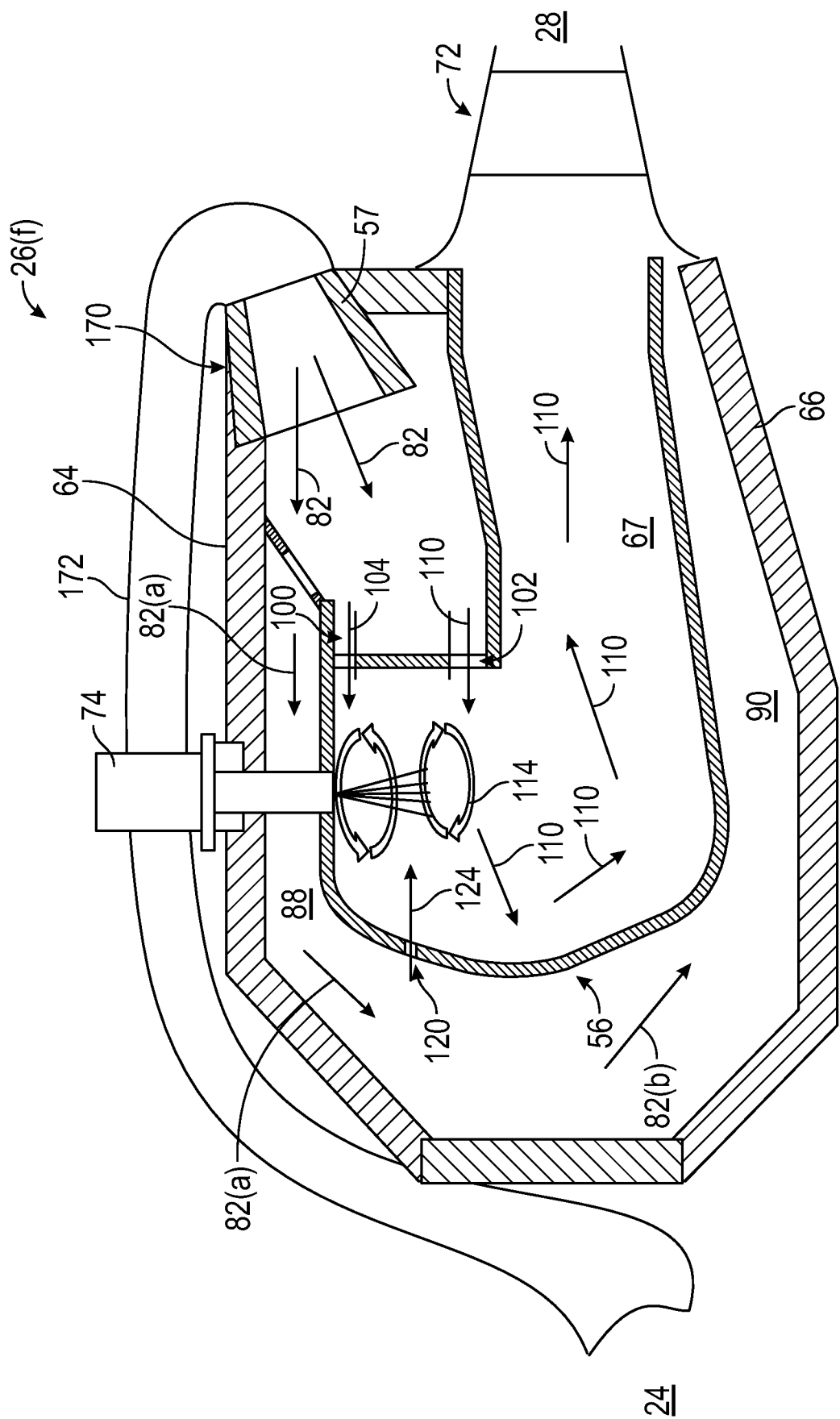
FIG. 15 is a partial cross-sectional side view of another alternate arrangement of the combustor to that shown in FIG. 2, according to another aspect of the present disclosure.

FIG. 14 is a partial cross-sectional side view of another alternate arrangement of a combustor 26(e) to that shown in FIG. 2, according to another aspect of the present disclosure. FIG. 15 is a partial cross-sectional side view of another alternate arrangement of a combustor 26(f) to that shown in FIG. 2, according to another aspect of the present disclosure. Both the FIG. 14 aspect and the FIG. 15 aspect are similar to the FIG. 2 aspect and, therefore, similar components are labeled with the same reference numerals. One difference between the FIG. 2 aspect and the FIG. 14 aspect and the FIG. 15 aspect, however, is the location of the diffuser 57. In the FIG. 14 aspect, instead of the diffuser 57 being arranged at the upstream end 53 of the combustor 26 between the outer casing 64 and the inner casing 66, the diffuser 57 may be arranged through the outer casing 64. In FIG. 14, the diffuser 57 is shown as being arranged near the upstream end 53 of the outer casing 64, and connected with the high pressure compressor 24 via ducting 168. This arrangement of the diffuser 57 may provide for a better flow of the compressed air 82(a) through the outer flow passage 88, thereby allowing an increase in the pressure of the flow of the compressed air 82(a) through the second-dome vortex driver airflow openings 100 and through the primary driver airflow openings 102 of the second dome structure 68. In the FIG. 15 aspect, the diffuser 57 is shown as being arranged near a downstream end 170 of the outer casing 64, and connected with the high pressure compressor 24 via ducting 172. This arrangement may further provide for a more direct flow of the compressed air 82 to the second-dome vortex driver airflow openings 100 and to the primary driver airflow openings 102, thereby resulting in a better primary driver airflow 110 through the combustion chamber 67.

Each of the foregoing arrangements provides for a trapped vortex combustor that is also a reverse flow combustor. As a result, the primary driver airflow into the combustor flow is from an aft-to-forward direction, and is then reversed to flow in a forward-to-aft direction, thereby providing for better mixing of the primary driver airflow with the combustion products. In addition, multiple trapped vortex flows can be provided within the combustor, thereby further increasing the mixing of the fuel and air, as well as better mixing of the combustion products with the primary driver airflow.

While the foregoing description relates generally to a gas turbine engine, the gas turbine engine may be implemented in various environments. For example, the engine may be implemented in an aircraft, but may also be implemented in non-aircraft applications, such as power generating stations, marine applications, or oil and gas production applications. Thus, the present disclosure is not limited to use in aircraft.

Further aspects of the present disclosure are provided by the subject matter of the following clauses.

A trapped vortex reverse flow combustor for a gas turbine, the trapped vortex reverse flow combustor including a first dome structure having a plurality of first-dome vortex driver airflow openings through the first dome structure, a forward outer liner extending from an outer end of the first dome structure, an inner liner extending from an inner end of the first dome structure, a second dome structure arranged downstream of the first dome structure and including a plurality of second-dome vortex driver airflow openings, and a plurality of primary driver airflow openings, and an aft outer liner radially arranged between the forward outer liner and the inner liner, wherein (a) a trapped vortex cavity is defined by the first dome structure, the forward outer liner, and the second dome structure, (b) the second dome structure extends between the forward outer liner and the aft outer liner, (c) the plurality of the first-dome vortex driver airflow openings providing a first vortex generating mid airflow therethrough to the trapped vortex cavity, (d) the plurality of the second-dome vortex driver airflow openings providing a first vortex generating outer airflow therethrough to the trapped vortex cavity, the first vortex generating mid airflow and the first vortex generating outer airflow generating a first trapped vortex flow within the trapped vortex cavity, and (e) the plurality of primary driver airflow openings providing a primary driver airflow therethrough radially inward of the trapped vortex cavity.

The trapped vortex reverse flow combustor according to the preceding clause, wherein the first dome structure includes a plurality of diffusion airflow injection openings therethrough.

The trapped vortex reverse flow combustor according to any preceding clause, further comprising a fuel nozzle arranged to inject a fuel to the trapped vortex cavity.

The trapped vortex reverse flow combustor according to any preceding clause, wherein the plurality of first-dome vortex driver airflow openings are arranged radially inward of the second-dome vortex driver airflow openings, and radially outward of the primary driver airflow openings, the first vortex generating mid airflow and the primary driver airflow generating a second trapped vortex flow within the trapped vortex cavity radially inward of the first trapped vortex flow.

The trapped vortex reverse flow combustor according to any preceding clause, wherein the first trapped vortex flow and the second trapped vortex flow are arranged to flow in opposing vortex swirl directions.

The trapped vortex reverse flow combustor according to any preceding clause, further comprising an outer casing defining an outer flow passage between the outer casing and the forward outer liner, an inner casing defining an inner flow passage between the inner casing and the inner liner, and a diffuser arranged to provide an inlet airflow to the outer flow passage and to the inner flow passage.

The trapped vortex reverse flow combustor according to any preceding clause, wherein the diffuser is arranged between an upstream end of the outer casing and an upstream end of the inner casing.

The trapped vortex reverse flow combustor according to any preceding clause, wherein the diffuser is arranged through the outer casing.

The trapped vortex reverse flow combustor according to any preceding clause, wherein, in operation of the trapped vortex reverse flow combustor, (1) the diffuser receives the inlet airflow, (2) a portion of the inlet airflow flows through the second-dome vortex driver airflow openings and provides the first vortex generating outer airflow to the trapped vortex cavity, (3) another portion of the inlet airflow flows through the first-dome vortex driver airflow openings and provides the first vortex generating mid airflow radially inward of the first vortex generating outer airflow to the trapped vortex cavity, (4) the first vortex generating mid airflow and the first vortex generating outer airflow generate the first trapped vortex flow within the trapped vortex cavity, (5) another portion of the inlet airflow flows through the primary driver airflow openings and provides the primary driver airflow therethrough radially inward of the trapped vortex cavity, and (6) the first vortex generating mid airflow and the primary driver airflow generate a second trapped vortex flow within the trapped vortex cavity radially inward of the first trapped vortex flow, the first trapped vortex flow and the second trapped vortex flow being in opposing swirl directions to one another.

The trapped vortex reverse flow combustor according to any preceding clause, wherein the inner liner includes a plurality of inner liner airflow openings therethrough, and further in operation of the trapped vortex reverse flow combustor, (6) another portion of the inlet airflow flows through the plurality of inner liner airflow openings to provide a secondary driver airflow therethrough, the primary driver airflow and the secondary driver airflow generating a secondary combustion zone vortex flow in a secondary combustion zone defined radially inward of the trapped vortex cavity.

The trapped vortex reverse flow combustor according to any preceding clause, wherein (i) the first dome structure includes an outer dome portion and an inner dome portion, the plurality of first-dome vortex driver airflow openings being arranged through the outer dome portion, (ii) the forward outer liner extends downstream from an outer end of the outer dome portion, (iii) the inner liner extends downstream from an inner end of the inner dome portion, (iv) the second dome structure extends radially inward from a downstream end of the forward outer liner, (v) the plurality of the second-dome vortex driver airflow openings are arranged at an outer end of the second dome structure, (vi) the plurality of the primary driver airflow openings are arranged at an inner end of the second dome structure, and (vii) the aft outer liner extends downstream from the inner end of the second dome structure.

The trapped vortex reverse flow combustor according to any preceding clause, wherein the trapped vortex cavity comprises a primary combustion zone, a secondary combustion zone being defined radially inward of the primary combustion zone by the inner dome portion and an upstream portion of the inner liner, and a tertiary combustion zone being defined between the aft outer liner and a downstream portion of the inner liner.

The trapped vortex reverse flow combustor according to any preceding clause, wherein the aft outer liner includes at least one of (i) a first extension portion extending upstream from the second dome structure and extending at least partially between the trapped vortex cavity and the secondary combustion zone, a first gap being defined between an upstream end of the first extension portion and the first dome structure, and (ii) a second extension portion extending radially inward between the secondary combustion zone and the tertiary combustion zone, a second gap being defined between a radially inner end of the second extension portion and the inner liner.

The trapped vortex reverse flow combustor according to any preceding clause, wherein the inner liner includes a plurality of inner liner airflow openings providing a secondary driver airflow therethrough, the primary driver airflow and the secondary driver airflow generating a secondary combustion zone vortex flow within the secondary combustion zone.

The trapped vortex reverse flow combustor according to any preceding clause, wherein the plurality of inner liner airflow openings comprises a plurality of dilution openings, and the secondary driver airflow comprising a dilution airflow.

The trapped vortex reverse flow combustor according to any preceding clause, wherein the outer dome portion and the inner dome portion define a turn portion arranged to direct the primary driver airflow to flow from the primary combustion zone to the secondary combustion zone.

The trapped vortex reverse flow combustor according to any preceding clause, wherein the first dome structure includes a plurality of secondary driver airflow openings therethrough providing a secondary driver airflow to the secondary combustion zone.

The trapped vortex reverse flow combustor according to any preceding clause, wherein the plurality of secondary driver airflow openings are arranged through the inner dome portion and are arranged at an angle so as to aerodynamically drive the primary driver airflow through the turn portion to the secondary combustion zone.

The trapped vortex reverse flow combustor according to any preceding clause, further comprising a plurality of support arms connecting the forward outer liner and the outer casing, a plurality of support windows being arranged between respective ones of the plurality of support arms.

The trapped vortex reverse flow combustor according to any preceding clause, wherein the plurality of support windows provide for a flow of the compressed air to flow through the outer flow passage to the second dome structure.

The trapped vortex reverse flow combustor according to any preceding clause, wherein the plurality of the second-dome vortex driver airflow openings comprise at least one slotted second-dome vortex driver airflow opening, and the plurality of primary driver airflow openings comprise at least one slotted primary driver airflow opening.

The trapped vortex reverse flow combustor according to any preceding clause, wherein the at least one slotted second-dome vortex driver airflow opening comprises an annular slot second-dome vortex driver airflow opening, and the at least one slotted primary driver airflow opening comprises an annular slot primary driver airflow opening.

The trapped vortex reverse flow combustor according to any preceding clause, wherein at least one of the annular slotted second-dome vortex driver airflow opening and the annular slotted primary driver airflow opening includes a plurality of castellations.

The trapped vortex reverse flow combustor according to any preceding clause, wherein a total amount of airflow injected into the combustion chamber includes a primary driver airflow in a range of about ten percent to about seventy percent of the total airflow injected into the combustion chamber, the first vortex generating outer airflow and the first vortex generating mid airflow in a range of about two percent to about twenty-five percent of the total airflow.

The trapped vortex reverse flow combustor according to any preceding clause, wherein, when a secondary driver airflow and/or a diffusion airflow is in a range of about five percent to about thirty percent of the total airflow into the combustion chamber.

The trapped vortex reverse flow combustor according to any preceding clause, wherein the first-dome structure includes a plurality of diffusion airflow injection openings therethrough.

The trapped vortex reverse flow combustor according to any preceding clause, wherein the plurality of diffusion airflow injection openings are arranged in a plurality of rows, each row extending circumferentially about the combustor centerline axis.

The trapped vortex reverse flow combustor according to any preceding clause, wherein the plurality of rows includes a first row arranged at a first radial distance from the combustor centerline axis, a second row arranged at a second radial distance greater than the first radial distance from the combustor centerline axis, and a third row arranged at a third radial distance greater than the second radial distance from the combustor centerline axis.

The trapped vortex reverse flow combustor according to any preceding clause, wherein diffusion airflow injection openings of the first row are circumferentially offset with respect to diffusion airflow injection openings of the second row.

The trapped vortex reverse flow combustor according to any preceding clause, wherein the diffusor is arranged between an upstream end of the outer casing and an upstream end of the inner casing.

The trapped vortex reverse flow combustor according to any preceding clause, wherein the diffusor is arranged through the outer casing.

The trapped vortex reverse flow combustor according to any preceding clause, wherein the diffusor is arranged through an upstream portion of the outer casing.

The trapped vortex reverse flow combustor according to any preceding clause, wherein the diffusor is arranged through a downstream portion of the outer casing.

The trapped vortex reverse flow combustor according to any preceding clause, wherein a size of the primary driver airflow openings is greater than a size of the first-dome vortex driver airflow openings, and greater than a size of the second-dome vortex generating airflow openings.

The trapped vortex reverse flow combustor according to any preceding clause, wherein a size of the second driver airflow openings is less that a size of the primary driver airflow openings, is greater than a size of the first-dome vortex generating airflow opening, and greater than a size of the second-dome vortex generating airflow openings.

A gas turbine including a compressor section, a turbine section, and a trapped vortex reverse flow combustor arranged between the compressor section and the turbine section, the trapped vortex reverse flow combustor including a first dome structure including an outer dome portion, an inner dome portion, and a plurality of first-dome vortex driver airflow openings through the outer dome portion, a forward outer liner extending downstream from an outer end of the first dome structure, an inner liner extending downstream from an inner end of the first dome structure, a second dome structure extending inward from a downstream end of the forward outer liner, the second dome structure including a plurality of second-dome vortex driver airflow openings arranged at an outer end of the second dome structure, and a plurality of primary driver airflow openings arranged at an inner end of the second dome structure, and an aft outer liner extending downstream from an inner end of the second dome structure, wherein (a) a trapped vortex cavity is defined by the outer dome portion, the forward outer liner, and the second dome structure, (b) the second-dome vortex driver airflow openings for providing a first vortex generating outer airflow therethrough to the trapped vortex cavity, (c) the first-dome vortex driver airflow openings for providing a first vortex generating mid airflow therethrough radially inward of the first vortex generating mid airflow, the first vortex generating mid airflow and the first vortex generating outer airflow for generating a first trapped vortex flow within the trapped vortex cavity, and (d) the primary driver airflow openings providing a primary driver airflow therethrough radially inward of the trapped vortex cavity.

The gas turbine according to the preceding clause, wherein the first vortex generating mid airflow and the primary driver airflow generate a second trapped vortex flow within the trapped vortex cavity radially inward of the first trapped vortex flow, the first trapped vortex flow and the second trapped vortex flow being in opposing vortex swirl directions.

The gas turbine according to the preceding clause, wherein the first dome structure includes a plurality of diffusion airflow injection openings therethrough.

The gas turbine according to any preceding clause, further comprising a fuel nozzle arranged to inject a fuel to the trapped vortex cavity.

The gas turbine according to any preceding clause, wherein the plurality of first-dome vortex driver airflow openings are arranged radially inward of the second-dome vortex driver airflow openings, and radially outward of the primary driver airflow openings, the first vortex generating mid airflow and the primary driver airflow generating a second trapped vortex flow within the trapped vortex cavity radially inward of the first trapped vortex flow.

The gas turbine according to any preceding clause, wherein the first trapped vortex flow and the second trapped vortex flow are arranged to flow in opposing vortex swirl directions.

The gas turbine according to any preceding clause, further comprising an outer casing defining an outer flow passage between the outer casing and the forward outer liner, an inner casing defining an inner flow passage between the inner casing and the inner liner, and a diffuser arranged to provide an inlet airflow to the outer flow passage and to the inner flow passage.

The gas turbine according to any preceding clause, wherein the diffuser is arranged between an upstream end of the outer casing and an upstream end of the inner casing.

The gas turbine according to any preceding clause, wherein the diffuser is arranged through the outer casing.

The gas turbine according to any preceding clause, wherein, in operation of the trapped vortex reverse flow combustor, (1) the diffuser receives the inlet airflow, (2) a portion of the inlet airflow flows through the second-dome vortex driver airflow openings and provides the first vortex generating outer airflow to the trapped vortex cavity, (3) another portion of the inlet airflow flows through the first-dome vortex driver airflow openings and provides the first vortex generating mid airflow radially inward of the first vortex generating outer airflow to the trapped vortex cavity, (4) the first vortex generating mid airflow and the first vortex generating outer airflow generate the first trapped vortex flow within the trapped vortex cavity, (5) another portion of the inlet airflow flows through the primary driver airflow openings and provides the primary driver airflow therethrough radially inward of the trapped vortex cavity, and (6) the first vortex generating mid airflow and the primary driver airflow generate a second trapped vortex flow within the trapped vortex cavity radially inward of the first trapped vortex flow, the first trapped vortex flow and the second trapped vortex flow being in opposing swirl directions to one another.

The gas turbine according to any preceding clause, wherein the inner liner includes a plurality of inner liner airflow openings therethrough, and further in operation of the trapped vortex reverse flow combustor, (6) another portion of the inlet airflow flows through the plurality of inner liner airflow openings to provide a secondary driver airflow therethrough, the primary driver airflow and the secondary driver airflow generating a secondary combustion zone vortex flow in a secondary combustion zone defined radially inward of the trapped vortex cavity.

The gas turbine according to any preceding clause, wherein (i) the first dome structure includes an outer dome portion and an inner dome portion, the plurality of first-dome vortex driver airflow openings being arranged through the outer dome portion, (ii) the forward outer liner extends downstream from an outer end of the outer dome portion, (iii) the inner liner extends downstream from an inner end of the inner dome portion, (iv) the second dome structure extends radially inward from a downstream end of the forward outer liner, (v) the plurality of the second-dome vortex driver airflow openings are arranged at an outer end of the second dome structure, (vi) the plurality of the primary driver airflow openings are arranged at an inner end of the second dome structure, and (vii) the aft outer liner extends downstream from the inner end of the second dome structure.

The gas turbine according to any preceding clause, wherein the trapped vortex cavity comprises a primary combustion zone, a secondary combustion zone being defined radially inward of the primary combustion zone by the inner dome portion and an upstream portion of the inner liner, and a tertiary combustion zone being defined between the aft outer liner and a downstream portion of the inner liner.

The gas turbine according to any preceding clause, wherein the aft outer liner includes at least one of (i) a first extension portion extending upstream from the second dome structure and extending at least partially between the trapped vortex cavity and the secondary combustion zone, a first gap being defined between an upstream end of the first extension portion and the first dome structure, and (ii) a second extension portion extending radially inward between the secondary combustion zone and the tertiary combustion zone, a second gap being defined between a radially inner end of the second extension portion and the inner liner.

The gas turbine according to any preceding clause, wherein the inner liner includes a plurality of inner liner airflow openings providing a secondary driver airflow therethrough, the primary driver airflow and the secondary driver airflow generating a secondary combustion zone vortex flow within the secondary combustion zone.

The gas turbine according to any preceding clause, wherein the plurality of inner liner airflow openings comprises a plurality of dilution openings, and the secondary driver airflow comprising a dilution airflow.

The gas turbine according to any preceding clause, wherein the outer dome portion and the inner dome portion define a turn portion arranged to direct the primary driver airflow to flow from the primary combustion zone to the secondary combustion zone.

The gas turbine according to any preceding clause, wherein the first dome structure includes a plurality of secondary driver airflow openings therethrough providing a secondary driver airflow to the secondary combustion zone.

The gas turbine according to any preceding clause, wherein the plurality of secondary driver airflow openings are arranged through the inner dome portion and are arranged at an angle so as to aerodynamically drive the primary driver airflow through the turn portion to the secondary combustion zone.

The gas turbine according to any preceding clause, further comprising a plurality of support arms connecting the forward outer liner and the outer casing, a plurality of support windows being arranged between respective ones of the plurality of support arms.

The gas turbine according to any preceding clause, wherein the plurality of support windows provide for a flow of the compressed air to flow through the outer flow passage to the second dome structure.

The gas turbine according to any preceding clause, wherein the plurality of the second-dome vortex driver airflow openings comprise at least one slotted second-dome vortex driver airflow opening, and the plurality of primary driver airflow openings comprise at least one slotted primary driver airflow opening.

The gas turbine according to any preceding clause, wherein the at least one slotted second-dome vortex driver airflow opening comprises an annular slot second-dome vortex driver airflow opening, and the at least one slotted primary driver airflow opening comprises an annular slot primary driver airflow opening.

The gas turbine according to any preceding clause, wherein at least one of the annular slotted second-dome vortex driver airflow opening and the annular slotted primary driver airflow opening includes a plurality of castellations.

The gas turbine according to any preceding clause, wherein a total amount of airflow injected into the combustion chamber includes a primary driver airflow in a range of about ten percent to about seventy percent of the total airflow injected into the combustion chamber, the first vortex generating outer airflow and the first vortex generating mid airflow in a range of about two percent to about twenty-five percent of the total airflow.

The gas turbine according to any preceding clause, wherein, when a secondary driver airflow and/or a diffusion airflow is in a range of about five percent to about thirty percent of the total airflow into the combustion chamber.

The gas turbine according to any preceding clause, wherein the first-dome structure includes a plurality of diffusion airflow injection openings therethrough.

The gas turbine according to any preceding clause, wherein the plurality of diffusion airflow injection openings are arranged in a plurality of rows, each row extending circumferentially about the combustor centerline axis.

The gas turbine according to any preceding clause, wherein the plurality of rows includes a first row arranged at a first radial distance from the combustor centerline axis, a second row arranged at a second radial distance greater than the first radial distance from the combustor centerline axis, and a third row arranged at a third radial distance greater than the second radial distance from the combustor centerline axis.

The gas turbine according to any preceding clause, wherein diffusion airflow injection openings of the first row are circumferentially offset with respect to diffusion airflow injection openings of the second row.

The gas turbine according to any preceding clause, wherein the diffusor is arranged between an upstream end of the outer casing and an upstream end of the inner casing.

The gas turbine according to any preceding clause, wherein the diffusor is arranged through the outer casing.

The gas turbine according to any preceding clause, wherein the diffusor is arranged through an upstream portion of the outer casing.

The gas turbine according to any preceding clause, wherein the diffusor is arranged through a downstream portion of the outer casing.

The gas turbine according to any preceding clause, wherein a size of the primary driver airflow openings is greater than a size of the first-dome vortex driver airflow openings, and greater than a size of the second-dome vortex generating airflow openings.

The gas turbine according to any preceding clause, wherein a size of the second driver airflow openings is less that a size of the primary driver airflow openings, is greater than a size of the first-dome vortex generating airflow opening, and greater than a size of the second-dome vortex generating airflow openings.

Although the foregoing description is directed to some exemplary embodiments of the present disclosure, other variations and modifications will be apparent to those skilled in the art, and may be made without departing from the spirit or the scope of the disclosure. Moreover, features described in connection with one embodiment of the present disclosure may be used in conjunction with other embodiments, even if not explicitly stated above.

I claim:

1. A trapped vortex reverse flow combustor for a gas turbine, the trapped vortex reverse flow combustor comprising:
    a first dome structure having a plurality of first-dome vortex driver airflow openings through the first dome structure;
    a forward outer liner extending from an outer end of the first dome structure;
    an inner liner extending from an inner end of the first dome structure;
    a second dome structure arranged downstream of the first dome structure and including a plurality of second-dome vortex driver airflow openings, and a plurality of primary driver airflow openings; and
    an aft outer liner radially arranged between the forward outer liner and the inner liner,
    wherein (a) a trapped vortex cavity is defined by the first dome structure, the forward outer liner, and the second dome structure, (b) the second dome structure extends between the forward outer liner and the aft outer liner, (c) the plurality of the first-dome vortex driver airflow openings providing a first vortex generating mid airflow therethrough to the trapped vortex cavity, (d) the plurality of the second-dome vortex driver airflow openings providing a first vortex generating outer airflow therethrough to the trapped vortex cavity, the first vortex generating mid airflow and the first vortex generating outer airflow generating a first trapped vortex flow within the trapped vortex cavity, (e) the plurality of primary driver airflow openings providing a primary driver airflow therethrough radially inward of the trapped vortex cavity, and (f) the first dome structure, the forward outer liner, the second dome structure, the aft outer liner, and the inner liner define a reverse flow combustion chamber therewithin that reverses a flow direction of the primary driver airflow through the reverse flow combustion chamber, and
    wherein the inner liner includes a plurality of inner liner airflow openings providing a secondary driver airflow therethrough, the primary driver airflow and the secondary driver airflow generating a secondary combustion zone vortex flow in a secondary combustion zone defined radially inward of the trapped vortex cavity.

2. The trapped vortex reverse flow combustor according to claim 1, wherein the first dome structure includes a plurality of diffusion airflow injection openings therethrough.

3. The trapped vortex reverse flow combustor according to claim 1, further comprising a fuel nozzle arranged to inject a fuel to the trapped vortex cavity.

4. The trapped vortex reverse flow combustor according to claim 1, wherein the plurality of first-dome vortex driver airflow openings are arranged radially inward of the second-dome vortex driver airflow openings, and radially outward of the primary driver airflow openings, the first vortex generating mid airflow and the primary driver airflow generating a second trapped vortex flow within the trapped vortex cavity radially inward of the first trapped vortex flow.

5. The trapped vortex reverse flow combustor according to claim 4, wherein the first trapped vortex flow and the second trapped vortex flow are arranged to flow in opposing vortex swirl directions.

6. The trapped vortex reverse flow combustor according to claim 1, further comprising an outer casing defining an outer flow passage between the outer casing and the forward outer liner, an inner casing defining an inner flow passage between the inner casing and the inner liner, and a diffuser arranged to provide an inlet airflow to the outer flow passage and to the inner flow passage.

7. The trapped vortex reverse flow combustor according to claim 6, wherein the diffuser is arranged between an upstream end of the outer casing and an upstream end of the inner casing.

8. The trapped vortex reverse flow combustor according to claim 6, wherein the diffuser is arranged through the outer casing.

9. The trapped vortex reverse flow combustor according to claim 6, wherein, in operation of the trapped vortex reverse flow combustor, (1) the diffuser receives the inlet airflow, (2) a portion of the inlet airflow flows through the plurality of the second-dome vortex driver airflow openings and provides the first vortex generating outer airflow to the trapped vortex cavity, (3) another portion of the inlet airflow flows through the plurality of the first-dome vortex driver airflow openings and provides the first vortex generating mid airflow radially inward of the first vortex generating outer airflow to the trapped vortex cavity, (4) the first vortex generating mid airflow and the first vortex generating outer airflow generate the first trapped vortex flow within the trapped vortex cavity, (5) another portion of the inlet airflow flows through the plurality of the primary driver airflow openings and provides the primary driver airflow therethrough radially inward of the trapped vortex cavity, and (6) the first vortex generating mid airflow and the primary driver airflow generate a second trapped vortex flow within the trapped vortex cavity radially inward of the first trapped vortex flow, the first trapped vortex flow and the second trapped vortex flow being in opposing swirl directions to one another.

10. The trapped vortex reverse flow combustor according to claim 9, wherein (7) another portion of the inlet airflow flows through the plurality of inner liner airflow openings to provide the secondary driver airflow therethrough to generate the secondary combustion zone vortex flow in the secondary combustion zone.

11. The trapped vortex reverse flow combustor according to claim 1, wherein (i) the first dome structure includes an outer dome portion and an inner dome portion, the plurality of first-dome vortex driver airflow openings being arranged through the outer dome portion, (ii) the outer dome portion defining an outer end of the first dome structure, (iii) the inner dome portion defining an inner end of the first dome structure, (iv) the forward outer liner extends downstream from the outer end of the outer dome portion, (v) the inner liner extends downstream from the inner end of the inner dome portion, (vi) the second dome structure extends radially inward from a downstream end of the forward outer liner, (vii) the plurality of the second-dome vortex driver airflow openings are arranged at an outer end of the second dome structure, (viii) the plurality of the primary driver airflow openings are arranged at an inner end of the second dome structure, and (ix) the aft outer liner extends downstream from the inner end of the second dome structure.

12. The trapped vortex reverse flow combustor according to claim 11, wherein the trapped vortex cavity comprises a primary combustion zone, the secondary combustion zone being defined radially inward of the primary combustion zone by the inner dome portion and an upstream portion of the inner liner, and a tertiary combustion zone being defined between the aft outer liner and a downstream portion of the inner liner.

13. The trapped vortex reverse flow combustor according to claim 12, wherein the aft outer liner includes at least one of (i) a first extension portion extending upstream from the second dome structure and extending at least partially between the trapped vortex cavity and the secondary combustion zone, a first gap being defined between an upstream end of the first extension portion and the first dome structure, and (ii) a second extension portion extending radially inward between the secondary combustion zone and the tertiary combustion zone, a second gap being defined between a radially inner end of the second extension portion and the inner liner.

14. The trapped vortex reverse flow combustor according to claim 1, wherein the inner liner includes a plurality of dilution openings providing a dilution airflow to the secondary combustion zone.

15. The trapped vortex reverse flow combustor according to claim 12, wherein the outer dome portion and the inner dome portion define a turn portion arranged to direct the primary driver airflow to flow from the primary combustion zone to the secondary combustion zone.

16. The trapped vortex reverse flow combustor according to claim 15, wherein the first dome structure includes a plurality of tertiary driver airflow openings therethrough providing a tertiary driver airflow to the secondary combustion zone.

17. The trapped vortex reverse flow combustor according to claim 16, wherein the plurality of tertiary driver airflow openings are arranged through the inner dome portion and are arranged at an angle so as to aerodynamically drive the primary driver airflow through the turn portion to the secondary combustion zone.

18. A gas turbine comprising:
a compressor section;
a turbine section; and
a trapped vortex reverse flow combustor arranged between the compressor section and the turbine section, the trapped vortex reverse flow combustor including:
a first dome structure including an outer dome portion, an inner dome portion, and a plurality of first-dome vortex driver airflow openings through the outer dome portion;
a forward outer liner extending downstream from an outer end of the first dome structure;
an inner liner extending downstream from an inner end of the first dome structure;
a second dome structure extending inward from a downstream end of the forward outer liner, the second dome structure including a plurality of second-dome vortex driver airflow openings arranged at an outer end of the second dome structure, and a plurality of primary driver airflow openings arranged at an inner end of the second dome structure; and
an aft outer liner extending downstream from an inner end of the second dome structure,
wherein (a) a trapped vortex cavity is defined by the outer dome portion, the forward outer liner, and the second dome structure, (b) the plurality of the second-dome vortex driver airflow openings providing a first vortex generating outer airflow therethrough to the trapped vortex cavity, (c) the plurality of the first-dome vortex driver airflow openings providing a first vortex generating mid airflow therethrough radially inward of the first vortex generating outer airflow, the first vortex generating mid airflow and the first vortex generating outer airflow generating a first trapped vortex flow within the trapped vortex cavity, and (d) the plurality of the primary driver airflow openings providing a primary driver airflow therethrough radially inward of the trapped vortex cavity, and (e) the first dome structure, the forward outer liner, the second dome structure, the aft outer liner, and the inner liner define a reverse flow combustion chamber therewithin that reverses a flow direction of the primary driver airflow through the reverse flow combustion chamber, and wherein the inner liner includes a plurality of inner liner airflow openings providing a secondary driver airflow therethrough, the primary driver airflow and the secondary driver airflow generating a secondary combustion zone vortex flow in a secondary combustion zone defined radially inward of the trapped vortex cavity.

19. The gas turbine according to claim 18, wherein the first vortex generating mid airflow and the primary driver airflow generate a second trapped vortex flow within the trapped vortex cavity radially inward of the first trapped vortex flow, the first trapped vortex flow and the second trapped vortex flow being in opposing vortex swirl directions.

* * * * *